United States Patent
Soualle et al.

(10) Patent No.: US 10,859,712 B2
(45) Date of Patent: Dec. 8, 2020

(54) METHOD FOR EACH OF A PLURALITY OF SATELLITES OF A SECONDARY GLOBAL NAVIGATION SATELLITE SYSTEM IN A LOW EARTH ORBIT

(71) Applicant: Airbus Defence and Space GmbH, Taufkirchen (DE)

(72) Inventors: Francis Soualle, Munich (DE); Mahamoudou Ouedraogo, Neubiberg (DE); Jean-Jacques Floch, Munich (DE); Alexander Zenzinger, Landshut (DE); Stefan Sassen, Munich (DE); Oliver Baur, Taufkirchen (DE); Jens Heim, Oehnboeck (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 317 days.

(21) Appl. No.: 15/879,631

(22) Filed: Jan. 25, 2018

(65) Prior Publication Data

US 2018/0210090 A1  Jul. 26, 2018

(30) Foreign Application Priority Data

Jan. 25, 2017 (EP) .................................. 17153003

(51) Int. Cl.
*G01S 19/41* (2010.01)
*G01S 19/39* (2010.01)
(Continued)

(52) U.S. Cl.
CPC ............ *G01S 19/41* (2013.01); *G01S 19/396* (2019.08); *G01S 19/40* (2013.01); *G01S 19/02* (2013.01);
(Continued)

(58) Field of Classification Search
CPC .......... G01S 19/41; G01S 19/02; G01S 19/14; G01S 19/39; G01S 19/40
(Continued)

(56) References Cited

U.S. PATENT DOCUMENTS 5,812,961 A   9/1998  Enge et al.
5,886,666 A   3/1999  Schellenberg et al.
(Continued)

OTHER PUBLICATIONS

"Use of High Altitude Platform Systems to Augment Ground Based APNT Systems", Crespilo, 2015.
(Continued)

*Primary Examiner* — Chuong P Nguyen
(74) *Attorney, Agent, or Firm* — Greer, Burns & Crain, Ltd.

(57) ABSTRACT

A method for each of a plurality of satellites of a secondary Global Navigation Satellite System, GNSS, in a Low Earth Orbit, LEO, comprising receiving GNSS signals, in a first frequency band, from Line-Of-Sight, LOS, satellites of at least one primary GNSS in a Medium Earth Orbit. Candidate sets of orbit and clock corrections for the LOS satellites are received. A Position-Velocity-Time, PVT, calculation is performed based on code and/or carrier pseudo-ranges between a respective satellite of the secondary GNSS and the LOS satellites. The code and/or carrier pseudo-ranges are derived from the GNSS signals and are corrected by a single set of the candidate sets. A short-term prediction model is determined for an orbit and clock of the respective satellite based on the PVT and is included in a navigation message, transmitted in a second frequency band, modulated onto a LEO navigation signal intended for terrestrial user equipment.

12 Claims, 11 Drawing Sheets

(51) Int. Cl.
*G01S 19/40* (2010.01)
*G01S 19/02* (2010.01)
*G01S 19/14* (2010.01)

(52) U.S. Cl.
CPC ............... *G01S 19/14* (2013.01); *G01S 19/39* (2013.01); *G01S 19/393* (2019.08)

(58) Field of Classification Search
USPC ............. 342/357.24, 357.23, 357.22, 357.52
See application file for complete search history.

(56) References Cited

U.S. PATENT DOCUMENTS

| | | | |
|---|---|---|---|
| 5,944,770 A | 8/1999 | Enge et al. | |
| 6,373,432 B1 | 4/2002 | Rabinowitz et al. | |
| 6,785,553 B2 | 8/2004 | Chang et al. | |
| 6,920,309 B1 | 7/2005 | Yung et al. | |
| 7,042,392 B2 | 5/2006 | Whelan et al. | |
| 7,142,159 B1 | 11/2006 | Farley | |
| 7,366,125 B1* | 4/2008 | Elliott | H04B 7/18521 370/316 |
| 7,792,487 B2* | 9/2010 | Monte | H04B 7/18567 455/12.1 |
| 8,296,051 B2 | 10/2012 | Cohen et al. | |
| 8,570,216 B2* | 10/2013 | Gutt | G01S 5/0263 342/357.44 |
| 8,989,652 B2* | 3/2015 | Whelan | H04B 7/18521 455/13.2 |
| 9,059,784 B2* | 6/2015 | Enge | G01S 19/03 |
| 9,121,932 B2* | 9/2015 | Janky | G01S 19/07 |
| 9,557,422 B1* | 1/2017 | Miller | G01S 19/07 |
| 9,612,340 B1* | 4/2017 | Miller | G01S 19/39 |
| 9,829,558 B2* | 11/2017 | Robinson | G01S 19/11 |
| 10,613,230 B2* | 4/2020 | Chambre | G01S 19/02 |
| 2005/0156782 A1 | 7/2005 | Whelan et al. | |
| 2005/0159891 A1* | 7/2005 | Cohen | G01S 19/06 701/470 |
| 2008/0001819 A1 | 1/2008 | Cohen et al. | |
| 2009/0189802 A1 | 7/2009 | Tillotson et al. | |
| 2011/0238308 A1* | 9/2011 | Miller | G01S 19/31 701/472 |
| 2012/0068885 A1 | 3/2012 | Goto et al. | |
| 2013/0332072 A1 | 12/2013 | Janky et al. | |
| 2014/0104102 A1* | 4/2014 | Enge | G01S 19/03 342/357.42 |

OTHER PUBLICATIONS

"Navigation-Related Services over Stratospheric Platforms", Ozimek 2004.

"A New Positioning/Navigation System Based on Pseudolites Installed on High Altitude Platforms Systems (HAPS)" Tsujii, 2004.

"Improving Accuracy and Redundancy with GPS and GLONASS PPP", Dr. David Russell.

European Search Report, dated Jul. 27, 2017, priority document.

"Leveraging Commercial Broadband LEO Constellations for Navigating", Reid et al., Sep. 16, 2016.

"Precise Onboard Orbit Determination for LEP Satellites with Real-Time Orbit and Clock Corrections", Hauschild et al., Sep. 16, 2016.

* cited by examiner

METHOD FOR EACH OF A PLURALITY OF SATELLITES OF A SECONDARY GLOBAL NAVIGATION SATELLITE SYSTEM IN A LOW EARTH ORBIT

CROSS-REFERENCES TO RELATED APPLICATIONS

This application claims the benefit of the European patent application No. 17153003.3 filed on Jan. 25, 2017, the entire disclosures of which are incorporated herein by way of reference.

BACKGROUND OF THE INVENTION

The disclosure concerns a method for each of a plurality of satellites of a secondary Global Navigation Satellite System, GNSS, in a Low Earth Orbit, LEO. Further the disclosure concerns a satellite, a terrestrial user equipment and a system comprising the secondary GNSS and the user equipment.

The cost for an implementation of a GNSS system providing highly accurate positioning performances strongly depends on the costs for the implementation of monitoring and data dissemination functions usually taking place on the ground via a dense network of ground monitoring stations on one side, and, on the other side, a dense network of ground up-link stations ensuring a high satellite connectivity for the upload of orbit and clock corrections to GNSS satellites. The determination of the orbits and clock corrections of the GNSS satellites is usually prone to a residual error from troposphere, ionosphere, multipath or radio frequency, RF, interferences when applying ground monitoring. Those degradations affecting the orbit and clock corrections will therefore propagate to the end-user positioning performances. Assuming those contributions suppressed another non-negligible contribution to the end-user positioning performances is represented by the prediction error for the orbit and clock offset at the end of their validity period, which usually depends on the satellite connectivity.

SUMMARY OF THE INVENTION

It is therefore an object to provide monitoring and data dissemination functions in space, avoiding significant ground infrastructures and lowering therefore the overall GNSS system cost, and simultaneously reducing the impact of propagation and local effects on one side, and, on the other side, reducing the prediction error of the orbit and clock offset to provide highly accurate positioning performance for the end-users.

According to a first aspect, a method for each of a plurality of satellites of a secondary Global Navigation Satellite System, GNSS, in a Low Earth Orbit, LEO, is provided. The method comprises receiving multiple GNSS signals, in a first frequency band, from Line-Of-Sight, LOS, satellites of at least one primary GNSS, in particular primary GNSSs, in a Medium Earth Orbit, MEO. The method further comprises receiving candidate sets of orbit and clock corrections for the LOS satellites of the at least one primary GNSS. The method further comprises performing a Position-Velocity-Time, PVT, calculation based on code and/or carrier pseudo-ranges between a respective satellite of the plurality of satellites of the secondary GNSS and the LOS satellites of the at least one primary GNSS. The code and/or carrier pseudo-ranges are derived from the received multiple GNSS signals. Further, the code and/or carrier pseudo-ranges are corrected by a single set of the candidate sets of orbit and clock corrections. The method further comprises determining a short-term prediction model for an orbit and clock of the respective satellite of the plurality of satellites of the secondary GNSS based on the PVT. The method further comprises transmitting, in a second frequency band, a navigation message modulated onto a LEO navigation signal intended for terrestrial user equipment. The navigation message includes the short-term prediction model. The second frequency band is different or identical to the first frequency band.

"Orbit and Clock corrections for the LOS satellites of the at least one primary GNSS" can be understood as correction for the orbit and clock state of the LOS satellites of the at least one primary GNSS.

The method can further comprise, after receiving the candidate sets of orbit and clock corrections, determining an optimal set of orbit and clock corrections from the candidate sets of orbit and clock corrections. Further, the single set of the candidate sets of orbit and clock corrections may be the optimal set of orbit and clock corrections.

The step of receiving the candidate sets of orbit and clock corrections can further comprise the step of receiving, from the LOS satellites of the at least one primary GNSS, at least part of the candidate sets of orbit and clock corrections included in user navigation message intended for terrestrial user equipment. The step of receiving the candidate sets of orbit and clock corrections can further comprise the step of receiving, from satellites of one or more Space-Based Augmentation Systems, SBAS, in a Geostationary Earth Orbit, GEO, at least part of the candidate sets of orbit and clock corrections, intended for terrestrial or airborne user equipment. The step of receiving the candidate sets of orbit and clock corrections can further comprise the step of receiving, from at least one on-demand service provider, via a communication module on the respective satellite of the plurality of satellites of the secondary GNSS, at least part of the candidate sets of orbit and clock corrections. The step of receiving the candidate sets of orbit and clock corrections can further comprise receiving from at least one LEO satellite of the plurality of satellites of the secondary GNSS and/or from at least one on-demand GEO or MEO satellite providing, via an intercommunication module on the respective satellite of the plurality of satellites of the secondary GNSS, at least part of the candidate sets of orbit and clock corrections.

The method can further comprise, after receiving the candidate sets of orbit and clock corrections, reducing a number of the candidate sets of orbit and clock corrections by using information about a newest Age Of Data, AoD, and/or any other ancillary parameters informing on the quality of a prediction error such as the Signal-In-Space Accuracy (SISA) and the DVS/SHS flags for Galileo, or the User-Range-Accuracy (URA) for GPS. Thus, the candidate sets of orbit and clock corrections can be reduced to a sub-set of candidate sets of orbit and clock corrections. The AoD represents the time epoch when the orbit and clock correction set was generated within the facility responsible for the orbit determination and time synchronization of the satellites. The sub-set of candidate sets of orbit and clock corrections may be understood as remaining sets of the candidate sets of orbit and clock corrections. The method can further comprise, after reducing the number of candidate sets of orbit and clock corrections, determining a common aging period of the remaining sets of the candidate sets of orbit and clock corrections. The method can further comprise selecting an optimal set of orbit and clock corrections to be applied to the code and/or carrier pseudo-ranges between the respective satellite of the plurality of satellites of the secondary GNSS and the LOS satellites of the at least one primary GNSS taking into account a prediction error over the common aging period. The method can further comprise correcting the code and/or carrier pseudo-ranges between the respective satellite of the plurality of satellites of the secondary GNSS and the LOS satellites of the at least one primary GNSS by the selected optimal set of orbit and clock corrections;

The method can further comprise the step of determining Delta code and/or carrier pseudo-ranges or simple Delta code and/or carrier pseudo-ranges. Further, the step of transmitting can further comprise transmitting the Delta code and/or carrier pseudo-ranges or the simple Delta code and/or carrier pseudo-ranges to the terrestrial user equipment, in a third frequency band, which is different or identical to the first and/or second frequency bands.

The method can further comprise receiving, from another satellite of the plurality of satellites of the secondary GNSS, corresponding simple Delta code and/or carrier pseudo-ranges. This may be performed via an inter-satellite communication link (ISL). The method can further comprise determining double Delta code and/or carrier pseudo-ranges based on the received simple Delta code and/or carrier pseudo-ranges and the on-board determined simple Delta code and/or carrier pseudo-ranges. The method can further comprise transmitting the determined double Delta code and/or carrier pseudo-ranges to the terrestrial user equipment, in a third frequency band, different from the first and/or second frequency bands.

According to a second aspect, a satellite for a secondary Global Navigation Satellite System, GNSS, operable in a Low Earth Orbit, LEO, is provided. The satellite comprises at least one receiving unit, an on-board computer unit, OBCU, and a transmitting unit. The satellite can comprise further transmitting/receiving units or a transceiving unit adapted to perform intercommunication with other satellites of the secondary GNSS. The at least one receiving unit, for example a first receiving unit, is adapted to receive multiple GNSS signals, in a first frequency band, from Line-of-sight, LOS, satellites of at least one primary GNSS, in particular primary GNSSs, in a Medium Earth Orbit, MEO. The at least one receiving unit, for example a second receiving unit, is adapted to receive candidate sets of orbit and clock corrections for the LOS satellites of the at least one primary GNSS. The on-board computer unit is adapted to perform a Position-Velocity-Time, PVT, calculation based on code and/or carrier pseudo-ranges between the satellite and the LOS satellites of the at least one primary GNSS. The code and/or carrier pseudo-ranges are derived from the received multiple GNSS signals. Further, the code and/or carrier pseudo-ranges are corrected by a single set of the candidate sets of orbit and clock corrections. Further, the on-board computer unit is adapted to determine a short-term prediction model for an orbit and clock of the satellite based on the PVT. The transmitting unit is adapted to transmit, in a second frequency band a navigation message modulated onto a LEO navigation signal intended for terrestrial user equipment. The navigation message includes the short-term prediction model. The second frequency band is different or identical to the first frequency band.

The OBCU may further be adapted to determine an optimal set of orbit and clock corrections from the candidate sets of orbit and clock corrections. The single set of the candidate sets of orbit and clock corrections may be the optimal set of orbit and clock corrections.

The satellite can comprise another receiving unit. The other receiving unit may be adapted to receive, from the LOS satellites of the at least one primary GNSS, at least part of the candidate sets of orbit and clock corrections included in user navigation data intended for terrestrial user equipment. The other receiving unit may be adapted to receive, from satellites of one or more Space-Based Augmentation Systems, SBAS, in a Geostationary Earth Orbit, GEO, at least part of the candidate sets of orbit and clock corrections, intended for terrestrial or airborne user equipment. The satellite may comprise a communication module. The other receiving unit or the communication module may be adapted to receive, from at least one on-demand service provider, at least part of the candidate sets of orbit and clock corrections.

According to a third aspect, a terrestrial user equipment is provided. The terrestrial user equipment comprises a receiving unit and a processing unit. The receiving unit is adapted to receive navigation signals including navigation messages from satellites each being a satellite according to the second aspect. The receiving unit is adapted to receive navigation signals including navigation messages from LOS satellites of at least one primary GNSS. The processing unit is adapted to determine a position based on the navigation messages and the navigation signals from satellites each being a satellite according to the second aspect.

The processing unit can further be adapted to determine a position based on the navigation messages and the navigations signals from the LOS satellites of the at least one primary GNSS, and/or based on the simple Delta code and/or carrier pseudo-ranges or the double Delta code and/or carrier pseudo-ranges. The simple Delta code and/or carrier pseudo-ranges or the double Delta code and/or carrier pseudo-ranges can be combined with the code and/or carrier pseudo-ranges measured with the navigation signals from the LOS satellites of the at least one primary GNSS. The Delta code and/or carrier pseudo-ranges, and/or the simple Delta code and/or carrier pseudo-ranges or the double Delta code and/or carrier pseudo-ranges can be transmitted in the third frequency band.

According to a fourth aspect a system is provided. The system comprises a secondary Global Navigation Satellite System, GNSS, and a terrestrial user equipment according to the third aspect. The GNSS includes the satellite according to the second aspect.

It is clear to a person skilled in the art that the statements set forth herein under use of hardware circuits, software means or a combination thereof may be implemented. The software means can be related to programmed microprocessors or a general computer, an ASIC (Application Specific Integrated Circuit) and/or DSPs (Digital Signal Processors). For example, the on-board computer unit may be implemented partially as a computer, logical circuit, processor (for example, a microprocessor, microcontroller (μC) or an array processor)/core/CPU (Central Processing Unit), FPU (Floating Point Unit), NPU (Numeric Processing Unit), ALU (Arithmetic Logical Unit), Coprocessor (further microprocessor for supporting a main processor (CPU)), GPGPU (General Purpose Computation on Graphics Processing Unit), multi-core processor (for parallel computing, such as simultaneously performing arithmetic operations on multiple main processor(s) and/or graphical processor(s)) or DSP. It is further clear to the person skilled in the art that even if the herein-described details will be described in terms of a method, these details may also be implemented or realized in a suitable device, a computer processor or a memory connected to a processor, wherein the memory with can be provided with one or more programs that perform the method, when executed by the processor. Therefore, methods like swapping and paging can be deployed.

Even if some of the aspects described above have been described in reference to the method, these aspects may also apply to the satellite. Likewise, the aspects described above in relation to the satellite may be applicable in a corresponding manner to the method.

Other objects, features, advantages and applications will become apparent from the following description of non-limiting embodiments with reference to the accompanying drawings. In the drawings, all described and/or illustrated features, alone or in any combination form the subject matter disclosed therein, irrespective of their grouping in the claims or their relations/references. The dimensions and proportions of components or parts shown in the figures are not necessarily to scale; these dimensions and proportions may differ from illustrations in the figures and implemented embodiments.

DETAILED DESCRIPTION OF THE PREFERRED EMBODIMENTS

Figure 1:
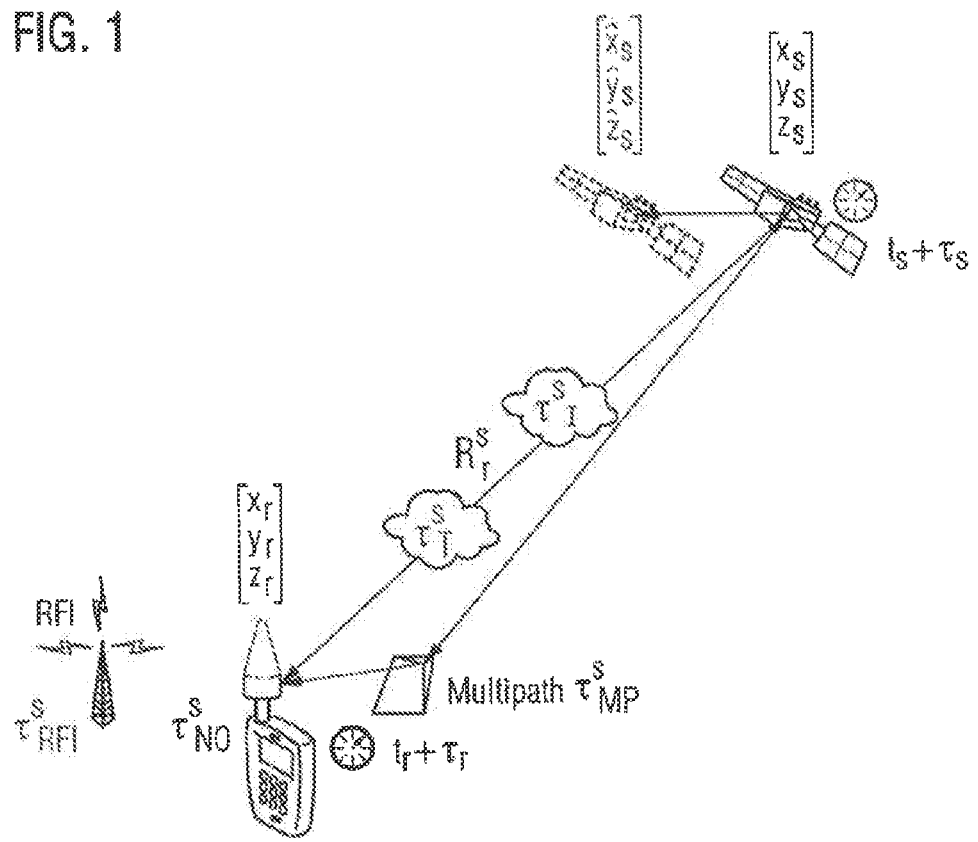
FIG. 1 schematically illustrates geometrical positions of a satellite transmitting a positioning signal and a user equipment, and different contributions to the pseudo-ranges for an exemplary LOS.

The variants of the functional and operational aspects as well as their functional and operational aspects described herein are only for a better understanding of its structure, its functions and properties; they do not limit the disclosure to the embodiments. The figures are partially schematic, said essential properties and effects are clearly shown enlarged in part in order to clarify the functions, active principles, embodiments and technical characteristics. Every operation, every principle, every technical aspect and every feature that/which is disclosed in the figures or in the text is/are able to be combined with all claims, each feature in the text and the other figures, other modes of operation, principles, technical refinements and features that are included in this disclosure, or result from it, so that all possible combinations are assigned to the devices and methods described. They also include combinations of all individual comments in the text, that is, in each section of the description, in the claims and combinations between different variations in the text, in the claims and in the figures, and can be made to subject-matter of further claims. The claims do not limit the disclosure and therefore the possible combinations of all identified characteristics among themselves. All features disclosed are explicitly also individually and in combination with all other features disclosed herein.

In the Figures herein, corresponding or functionally similar components are provided with the same or similar reference numerals. The method, the satellite, the system and the user equipment will now be described with reference to embodiments.

In the following, without being restricted thereto, specific details are set forth to provide a thorough understanding of the present disclosure. However, it is clear to the skilled person that the present disclosure may be used in other embodiments, which may differ from the details set out below.

FIG. 1 illustrates geometrical positions of a satellite transmitting a positioning signal and a user equipment, and different contributions to the pseudo-ranges for an exemplary LOS.

Parameters and variables are illustrated in FIG. 1, explained as follows:

$R_r^s$ represents a true ("Physical") distance between a satellite and a user equipment.

ts represents a time of transmission, also referred to as "local satellite time referential" including satellite clock offset.

tr represents a time of reception, also referred to as "local receiver time referential" including user clock offset.

$\tau s$ represents a satellite clock offset evaluated at time of transmission.

$\tau r$ represents a receiver clock offset evaluated at time of reception.

$\tau_I^s$ represents a contribution of an Ionosphere onto a propagation delay.

$\tau_T^s$ represents a contribution of a Troposphere onto the propagation delay.

$\tau_{MP}^s$ represents a contribution of a local Multipath onto the propagation delay.

$\tau_{RFI}^s$ represents a contribution of a local Radio Frequency Interference (RFI) onto the propagation delay.

$\tau_{N0}^s$ represents a contribution of thermal noise onto the propagation delay.

$[x_r \; y_r \; z_r]^T$ represents a coordinate vector of the user equipment to be estimated.

$[x_s \; y_s \; z_s]^T$ represents a coordinate vector of a true satellite position.

$[\hat{x}_s \; \hat{y}_s \; \hat{z}_s]^T$ represents a coordinate vector of the predicted satellite position, which is usually computed (estimated) based on models computed in the central processing facility of a navigation system and encoded onto the navigation signal. Alternatively, the predicted satellite position can also be computed based on models provided by another navigation service operator and made available to the user equipment via another mean, such as the internet.

In the following the generic method used to estimate the position and clock offset of the user equipment following the point position technique is described, together with the contribution of degrading parameters, and especially the contribution of the orbit and clock offset prediction error. The objective is to ease the understanding of the disclosure based on the following equations which will be re-used in different contexts within the disclosure.

Assuming an "ideal" satellite and receiver/user equipment clock (free of drift), the distance between satellite and user equipment is given by the following equation, where c0 represents the speed of light:

$$R_r^s = c_0 \cdot (t_r - t_s) \quad \text{(eq. 1)}$$

Due to the clock offsets at satellite and user equipment, the pseudo-range (PR) expression, without any additional perturbing contributions, can be derived by the former equation as:

$$PR_r^s = c_0 \cdot ((t_r + \tau_r) - (t_s + \tau_s)) = R_r^s + c_0 \cdot (\tau_r - \tau_s). \quad \text{(eq. 2)}$$

The true satellite to user equipment distance can also be expressed as $$R_r^s = \sqrt{(x_s - x_r)^2 + (y_s - y_r)^2 + (z_s - z_r)^2} \quad \text{(eq. 3)}$$

(eq. 2) can be rewritten as follows, when accounting now for all other contributions to the pseudo-range measurement:

$$PR_r^s = \sqrt{(x_s - x_r)^2 + (y_s - y_r)^2 + (z_s - z_r)^2} + c_0 \cdot (\tau_r - \tau_s) + \tau_I^s + \tau_T^s + \tau_{RFI}^s + \tau_{MP}^s + \tau_{N0}^s \quad \text{(eq. 4)}$$

In (eq. 4), four unknowns have to be estimated at the user equipment: the three user equipment coordinates, $[x_r, y_r, z_r]$, and the user equipment clock offset, $\tau r$. For point positioning techniques, it is usual to linearize the former equation around a rough estimate of the user equipments position, $[\tilde{x}_{0,r}, \tilde{y}_{0,r}, \tilde{z}_{0,r}]$ yielding:

$$PR_r^s \approx R_{0,r}^s - \frac{(x_s - \tilde{x}_{0,r})}{R_{0,r}^s} \cdot \Delta x_r - \frac{(y_s - \tilde{y}_{0,r})}{R_{0,r}^s} \cdot \Delta y_r - \frac{(z_s - \tilde{z}_{0,r})}{R_{0,r}^s} \cdot \Delta z_r + c_0 \cdot (\tau_r - \tau_s) + \tau_I^s + \tau_T^s + \tau_{RFI}^s + \tau_{MP}^s + \tau_{N0}^s \quad \text{(eq. 5)}$$

In the former equation, the increments relative to the rough estimated position are given by $\Delta x = x_r - \tilde{x}_{0,r}$, $\Delta y = y_r - \tilde{y}_{0,r}$ and $\Delta z = z_r - \tilde{z}_{0,r}$.

The distance between the true satellite position and the rough user equipments position can be expressed similarly with the predicted satellite position provided for example in the user navigation message, using again a linearization technique, since the user equipment ignores the exact satellite position.

$$R_{0,r}^s = \sqrt{(x_s - \tilde{x}_{0,r})^2 + (y_s - \tilde{y}_{0,r})^2 + (z_s - \tilde{z}_{0,r})^2} \quad \text{(eq. 6)}$$

$$\approx \hat{R}_{0,r}^s + \frac{(\hat{x}_s - \tilde{x}_{0,r})}{\hat{R}_{0,r}^s} \cdot (\hat{x}_s - x_s) + \frac{(\hat{y}_s - \tilde{y}_{0,r})}{\hat{R}_{0,r}^s} \cdot (\hat{y}_s - y_s) + \frac{(\hat{z}_s - \tilde{z}_{0,r})}{\hat{R}_{0,r}^s} \cdot (\hat{z}_s - z_s)$$

$$= \hat{R}_{0,r}^s + \delta \hat{R}_{0,r}^{orb,s}$$

with $\hat{R}_{0,r}^s = \sqrt{(\hat{x}_s - \tilde{x}_{0,r})^2 + (\hat{y}_s - \tilde{y}_{0,r})^2 + (\hat{z}_s - \tilde{z}_{0,r})^2}$ and $$\delta \hat{R}_{0,r}^{orb,s} = \frac{1}{\hat{R}_{0,r}^s} [(\hat{x}_s - \tilde{x}_{0,r}) \cdot (\hat{x}_s - x_s) + (\hat{y}_s - \tilde{y}_{0,r}) \cdot (\hat{y}_s - y_s) + (\hat{z}_s - \tilde{z}_{0,r}) \cdot (\hat{z}_s - z_s)]$$

In the former equation $\Delta \hat{R}_{0,r}^{orb,s}$ represents the inner product between the satellite position prediction error with coordinates $([(\hat{x}_s - x_s), (\hat{y}_s - y_s), (\hat{z}_s - z_s)])$ and the normalized predicted satellite-to-rough-user equipment position with coordinates $$\left( \frac{1}{\hat{R}_{0,r}^s} [(\hat{x}_s - \tilde{x}_{0,r}), (\hat{y}_s - \tilde{y}_{0,r}), (\hat{z}_s - \tilde{z}_{0,r})] \right).$$

Because the satellite altitude is much larger than the distance between the true and the rough equipment position, this quantity can also be approximated to an inner product between the satellite position prediction error and the normalized satellite-to-true-user equipment position.

$$\delta \hat{R}_{0,r}^{orb,s} \approx \delta \hat{R}_r^{orb,s} = \quad \text{(eq. 7)}$$

$$\frac{1}{\hat{R}_r^s} [(\hat{x}_s - x_r) \cdot (\hat{x}_s - x_s) + (\hat{y}_s - y_r) \cdot (\hat{y}_s - y_s) + (\hat{z}_s - z_r) \cdot (\hat{z}_s - z_s)]$$

Actually, this quantity can be considered as a constant for user equipment positions lying in a vicinity of the true user equipment positions:

$$\frac{1}{\hat{R}_{r1}^s} [(\hat{x}_s - x_{r1}) \cdot (\hat{x}_s - x_s), (\hat{y}_s - y_{r1}) \cdot (\hat{y}_s - y_s), (\hat{z}_s - z_{r1}) \cdot (\hat{z}_s - z_s)] \approx \quad \text{(eq. 8)}$$

$$\frac{1}{\hat{R}_{r2}^s} [(\hat{x}_s - x_{r2}) \cdot (\hat{x}_s - x_s),$$

$$(\hat{y}_s - y_{r2}) \cdot (\hat{y}_s - y_s), (\hat{z}_s - z_{r2}) \cdot (\hat{z}_s - z_s)]$$

if $$[(x_{r2} - x_{r1}) \cdot (x_{r2} - x_{r1}) + (y_{r2} - y_{r1}) \cdot (y_{r2} - y_{r1}) +$$

$$(z_{r2} - z_{r1}) \cdot (z_{r2} - z_{r1})] \ll [(\hat{x}_s - x_{r1}) \cdot (\hat{x}_s - x_{r1}),$$

$$(\hat{y}_s - y_{r1}) \cdot (\hat{y}_s - y_{r1}), (\hat{z}_s - z_{r1}) \cdot (\hat{z}_s - z_{r1})]$$

Inserting (eq.6) into (eq.5) yields the pseudo-range equation between one user equipment and a Line-of-Sight (LOS) satellite is given by:

$$PR_r^s \approx \hat{R}_{0,r}^s + \delta \hat{R}_{0,r}^{orb,s} - \frac{(x_s - \tilde{x}_{0,r})}{R_{0,r}^s} \cdot \Delta x_r - \frac{(y_s - \tilde{y}_{0,r})}{R_{0,r}^s} \cdot \Delta y_r - \frac{(z_s - \tilde{z}_{0,r})}{R_{0,r}^s} \cdot \Delta z_r + c_0 \cdot (\tau_r - \tau_s) + \tau_I^s + \tau_T^s + \tau_{RFI}^s + \tau_{MP}^s + \tau_{N0}^s \quad \text{(eq. 9)}$$

Finally, a clock prediction model, $\hat{\tau}_s$, for the satellite clock offset, is, is also provided in the user navigation message in order for the user equipment to correct (ideally suppress) the corresponding satellite clock offset.

$$PR_r^s \approx \hat{R}_{0,r}^s + \delta \hat{R}_{0,r}^{orb,s} - \frac{(x_s - \tilde{x}_{0,r})}{R_{0,r}^s} \cdot \Delta x_r - \quad \text{(eq. 10)}$$

$$\frac{(y_s - \tilde{y}_{0,r})}{R_{0,r}^s} \cdot \Delta y_r - \frac{(z_s - \tilde{z}_{0,r})}{R_{0,r}^s} \cdot \Delta z_r +$$

$$c_0 \cdot (\tau_r - (\tau_s - \hat{\tau}_s)) + \tau_I^s + \tau_T^s + \tau_{RFI}^s + \tau_{MP}^s + \tau_{NO}^s$$

$$PR_r^s \approx \hat{R}_{0,r}^s + \delta \hat{R}_{0,r}^{orb,s} - \frac{(x_s - \tilde{x}_{0,r})}{R_{0,r}^s} \cdot \Delta x_r - \frac{(y_s - \tilde{y}_{0,r})}{R_{0,r}^s} \cdot \Delta y_r -$$

$$\frac{(z_s - \tilde{z}_{0,r})}{R_{0,r}^s} \cdot \Delta z_r + c_0 \cdot (\tau_r - \delta \hat{\tau}_s) + \tau_I^s + \tau_T^s + \tau_{RFI}^s + \tau_{MP}^s + \tau_{NO}^s$$

In the former equation $\delta \hat{\tau}_s = (\tau_s - \hat{\tau}_s)$ represents the satellite clock offset prediction error.

The residual of the satellite clock offset prediction error, $c_0 \cdot \delta \hat{\tau}_s$, can be merged with the residual for the orbit prediction error, $\delta \hat{R}_{0,r}^{orb,s}$, for each LOS, yielding $\delta \hat{R}_{0,r}^s = \delta \hat{R}_{0,r}^{orb,s} - c_0 \cdot \delta \hat{\tau}_s$. The former equation becomes then:

$$PR_r^s \approx \hat{R}_{0,r}^s - \frac{(x_s - \tilde{x}_{0,r})}{R_{0,r}^s} \cdot \Delta x_r - \frac{(y_s - \tilde{y}_{0,r})}{R_{0,r}^s} \cdot \Delta y_r - \quad \text{(eq. 11)}$$

$$\frac{(z_s - \tilde{z}_{0,r})}{R_{0,r}^s} \cdot \Delta z_r + c_0 \cdot \tau_r + \delta \hat{R}_{0,r}^s + \tau_I^s + \tau_T^s + \tau_{RFI}^s + \tau_{MP}^s + \tau_{NO}^s$$

Instead of using code measurements for the derivation of the code pseudo-range expression of (eq. 5) it is also possible to use carrier measurements. In that case the expression for the carrier pseudo-range becomes:

$$PRC_r^s \approx \quad \text{(eq. 12)}$$

$$R_{0,r}^s - \frac{(x_s - \tilde{x}_{0,r})}{R_{0,r}^s} \cdot \Delta x_r - \frac{(y_s - \tilde{y}_{0,r})}{R_{0,r}^s} \cdot \Delta y_r - \frac{(z_s - \tilde{z}_{0,r})}{R_{0,r}^s} \cdot \Delta z_r +$$

$$c_0 \cdot (\varphi_r - \varphi_s) + N \times \lambda + \varphi_I^s + \varphi_T^s + \varphi_{RFI} + \varphi_{MP} + \varphi_{NO}$$

In this expression, all delays using the symbol $\tau$ and applicable for the code are now replaced with delays using the symbol $\varphi$ and applicable for the carrier. Hence:

$\varphi s$ represents a satellite clock offset evaluated at time of transmission.

$\varphi r$ represents a receiver clock offset evaluated at time of reception.

$\varphi_I^s$ represents a contribution of an Ionosphere onto a propagation delay.

$\varphi_T^s$ represents a contribution of a Troposphere onto the propagation delay.

$\varphi_{MP}^s$ represents a contribution of a local Multipath onto the propagation delay.

$\varphi_{RFI}^s$ represents a contribution of a local Radio Frequency Interference (RFI) onto the propagation delay.

Finally, an additional parameter called carrier ambiguity, $N \times \lambda$, is included and corresponds to an integer number of wavelengths ($\lambda \sim = 20$ cm for L-band GNSS). Carrier pseudo-ranges can be handled similarly to code pseudo-ranges with the exception that additional algorithms are needed to solve the carrier ambiguity (the description of these algorithms is out-of-scope of the proposed disclosure).

In the following, the demonstrations and derivations will be carried out by using code pseudo-ranges, but equivalent demonstrations and derivations can also be achieved by using carrier pseudo-ranges. This is especially true when considering that an equivalent expression for (eq. 11) obtained with code pseudo-ranges can be obtained for carrier pseudo-ranges and will also include the terms $\hat{R}_{0,r}^s$ and $\hat{R}_{0,r}^s$. Now, the proposed demonstrations and derivations are not explicitly provided for reason of conciseness. This is the reason why the expression code and/or carrier pseudo-ranges is applied in most of the proposed disclosure.

The determination of the four user equipment unknowns necessitates at least four LOS satellites of the GNSS to have four linearized pseudo-range equations. Rearranging the terms yields the following set of equations.

$$\Delta PR_r^{s1} = \hat{R}_{0,r}^{s1} - PR_r^{s1} \approx \quad \text{(eq. 13)}$$

$$\frac{(x_{s1} - \tilde{x}_{0,r})}{R_{0,r}^{s1}} \cdot \Delta x_r + \frac{(y_{s1} - \tilde{y}_{0,r})}{R_{0,r}^{s1}} \cdot \Delta y_r + \frac{(z_{s1} - \tilde{z}_{0,r})}{R_{0,r}^{s1}} \cdot \Delta z_r -$$

$$c_0 \cdot \tau_r - \left( \delta \hat{R}_{0,r}^{s1} + \tau_I^{s1} + \tau_I^{s1} + \tau_{RFI}^{s1} + \tau_{MP}^{s1} + \tau_{NO}^{s1} \right)$$

$$\Delta PR_r^{s2} = \hat{R}_{0,r}^{s2} - PR_r^{s2} \approx \frac{(x_{s2} - \tilde{x}_{0,r})}{R_{0,r}^{s2}} \cdot \Delta x_r +$$

$$\frac{(y_{s2} - \tilde{y}_{0,r})}{R_{0,r}^{s2}} \cdot \Delta y_r + \frac{(z_{s2} - \tilde{z}_{0,r})}{R_{0,r}^{s2}} \cdot \Delta z_r - c_0 \cdot \tau_r -$$

$$\left( \delta \hat{R}_{0,r}^{s2} + \tau_I^{s2} + \tau_I^{s2} + \tau_{RFI}^{s2} + \tau_{MP}^{s2} + \tau_{NO}^{s2} \right)$$

$$\Delta PR_r^{s3} = \hat{R}_{0,r}^{s3} - PR_r^{s3} \approx \frac{(x_{s3} - \tilde{x}_{0,r})}{R_{0,r}^{s3}} \cdot \Delta x_r +$$

$$\frac{(y_{s3} - \tilde{y}_{0,r})}{R_{0,r}^{s3}} \cdot \Delta y_r + \frac{(z_{s3} - \tilde{z}_{0,r})}{R_{0,r}^{s3}} \cdot \Delta z_r - c_0 \cdot \tau_r -$$

$$\left( \delta \hat{R}_{0,r}^{s3} + \tau_I^{s3} + \tau_I^{s3} + \tau_{RFI}^{s3} + \tau_{MP}^{s3} + \tau_{NO}^{s3} \right)$$

$$\Delta PR_r^{s4} = \hat{R}_{0,r}^{s4} - PR_r^{s4} \approx \frac{(x_{s4} - \tilde{x}_{0,r})}{R_{0,r}^{s4}} \cdot \Delta x_r +$$

$$\frac{(y_{s4} - \tilde{y}_{0,r})}{R_{0,r}^{s4}} \cdot \Delta y_r + \frac{(z_{s4} - \tilde{z}_{0,r})}{R_{0,r}^{s4}} \cdot \Delta z_r - c_0 \cdot \tau_r -$$

$$\left( \delta \hat{R}_{0,r}^{s4} + \tau_I^{s4} + \tau_I^{s4} + \tau_{RFI}^{s4} + \tau_{MP}^{s4} + \tau_{NO}^{s4} \right)$$

By collecting all contributions errors applicable to each satellite of index s, into a single term $\varepsilon_r^s = -(\delta \hat{R}_{0,r}^s + \tau_I^s + \tau_T^s + \tau_{RFI}^s + \tau_{MP}^s + \tau_{NO}^s)$, enables one to synthetize the former set of equations as follows:

$$\Delta PR_r^{s1} = \hat{R}_{0,r}^{s1} - PR_r^{s1} \quad \text{(eq. 14)}$$

$$\approx \frac{(x_{s1} - \tilde{x}_{0,r})}{R_{0,r}^{s1}} \cdot \Delta x_r + \frac{(y_{s1} - \tilde{y}_{0,r})}{R_{0,r}^{s1}} \cdot$$

$$\Delta y_r + \frac{(z_{s1} - \tilde{z}_{0,r})}{R_{0,r}^{s1}} \cdot \Delta z_r - c_0 \cdot \tau_r + \varepsilon_r^{s1}$$

$$\Delta PR_r^{s2} = \hat{R}_{0,r}^{s2} - PR_r^{s2}$$

$$\approx \frac{(x_{s2} - \tilde{x}_{0,r})}{R_{0,r}^{s2}} \cdot \Delta x_r + \frac{(y_{s2} - \tilde{y}_{0,r})}{R_{0,r}^{s2}} \cdot$$

$$\Delta y_r + \frac{(z_{s2} - \tilde{z}_{0,r})}{R_{0,r}^{s2}} \cdot \Delta z_r - c_0 \cdot \tau_r + \varepsilon_r^{s2}$$

-continued $$\Delta PR_r^{s3} = \hat{R}_{0,r}^{s3} - PR_r^{s3}$$

$$\approx \frac{(x_{s3} - \tilde{x}_{0,r})}{R_{0,r}^{s3}} \cdot \Delta x_r + \frac{(y_{s3} - \tilde{y}_{0,r})}{R_{0,r}^{s3}} \cdot$$

$$\Delta y_r + \frac{(z_{s3} - \tilde{z}_{0,r})}{R_{0,r}^{s3}} \cdot \Delta z_r - c_0 \cdot \tau_r + \varepsilon_r^{s3}$$

$$\Delta PR_r^{s2} = \hat{R}_{0,r}^{s4} - PR_r^{s4}$$

$$\approx \frac{(x_{s4} - \tilde{x}_{0,r})}{R_{0,r}^{s4}} \cdot \Delta x_r + \frac{(y_{s4} - \tilde{y}_{0,r})}{R_{0,r}^{s4}} \cdot$$

$$\Delta y_r + \frac{(z_{s4} - \tilde{z}_{0,r})}{R_{0,r}^{s4}} \cdot \Delta z_r - c_0 \cdot \tau_r + \varepsilon_r^{s4}$$

This set of equations can be written in a matrix-vector notation, as follows:

$$\Delta PR = H \cdot \Delta X + E \quad \text{(eq. 15)}$$

with $$H = \begin{bmatrix} \frac{(x_{s1} - \tilde{x}_{0,r})}{R_{0,r}^{s1}} & \frac{(y_{s1} - \tilde{y}_{0,r})}{R_{0,r}^{s1}} & \frac{(z_{s1} - \tilde{z}_{0,r})}{R_{0,r}^{s1}} & -c_0 \\ \frac{(x_{s2} - \tilde{x}_{0,r})}{R_{0,r}^{s2}} & \frac{(y_{s2} - \tilde{y}_{0,r})}{R_{0,r}^{s2}} & \frac{(z_{s2} - \tilde{z}_{0,r})}{R_{0,r}^{s2}} & -c_0 \\ \frac{(x_{s2} - \tilde{x}_{0,r})}{R_{0,r}^{s3}} & \frac{(y_{s3} - \tilde{y}_{0,r})}{R_{0,r}^{s3}} & \frac{(z_{s3} - \tilde{z}_{0,r})}{R_{0,r}^{s3}} & -c_0 \\ \frac{(x_{s1} - \tilde{x}_{0,r})}{R_{0,r}^{s4}} & \frac{(y_{s4} - \tilde{y}_{0,r})}{R_{0,r}^{s4}} & \frac{(z_{s4} - \tilde{z}_{0,r})}{R_{0,r}^{s4}} & -c_0 \end{bmatrix}$$

and $$\Delta X = [\Delta x_r, \Delta y_r, \Delta z_r, \tau_r]^T \text{ with } \Delta x = x_r - \tilde{x}_{0,r},$$

$$\Delta y = y_r - \tilde{y}_{0,r} \text{ and } \Delta z = z_r - \tilde{z}_{0,r}.$$

$$\Delta PR = [\Delta PR_r^{s1}, \Delta PR_r^{s2}, \Delta PR_r^{s3}, \Delta PR_r^{s4}]^T$$

$$E = [\varepsilon_r^{s1}, \varepsilon_r^{s2}, \varepsilon_r^{s3}, \varepsilon_r^{s4}]^T$$

Minimization of a functional f(E) of E is used to get an estimate $\Delta \tilde{X}$ of $\Delta X$. For instance, (unweighted) least-squares adjustment minimizes $f(E) = E^T E$, yielding the best linear unbiased estimate $\Delta \tilde{X}$:

$$\Delta \tilde{X} = [H^T \cdot H]^{-1} \cdot H^T \cdot \Delta PR \quad \text{(eq. 16)}$$

and $\Delta \tilde{X} = [\Delta \tilde{x}_r, \Delta \tilde{y}_r, \Delta \tilde{z}_r, \tilde{\tau}_r]^T$ with $\Delta \tilde{x} = \tilde{x}_r - \tilde{x}_{0,r}$, $\Delta \tilde{y} = \tilde{y}_r - \tilde{y}_{0,r}$ and $\Delta \tilde{z} = \tilde{z}_r - \tilde{z}_{0,r}$.

It appears that in specific environments such as in urban canyons, even if the theoretical number of ranging sources corresponding to the MEO satellites of the main GNSS primary Systems such as GPS, Galileo, GLONAS, COMPASSS has increased, an effective number of visible MEO satellites with an elevation angle larger than an "urban horizon profile" (typically 40°), for a user equipment to include in its navigation solution is quite limited. As a consequence, including much more ranging sources transmitted by LEO satellites belonging to constellations counting hundreds or more LEO satellites can improve significantly the visibility situation.

Furthermore, intentional or non-intentional radio frequency interferences might prohibit the access to usual L-Band (first frequency band) navigation signals of conventional GNSS. Therefore, it is possible to offer alternative frequencies of a frequency band also dedicated to GNSS, for example in S- or C-band, where interferers would not operate at the same time. This would offer a better resilience and position service availability for the user equipment. Now, transmitting the LEO signals in the same frequency L-Band as for conventional GNSS systems would enable one to keep the same hardware, front-end configuration, for the user equipment, avoiding in that way a costlier user equipment. As a matter of fact, both options for the "user signals LEO frequency", i.e. transmitting in the same L-band frequency or in another frequency allotted for navigation, can be envisaged and are retained in the frame of the disclosure.

The corresponding signals transmitted in the "user signals LEO frequency" will be used for ranging, applying a similar signal structure as typical GNSS signals which is based on a CDMA technology comprising spreading sequences modulated with a navigation message. The corresponding signals are called "LEO navigation signals".

Another reason to have additional ranging sources is related to specific navigation services such as the Commercial Services (CS) of the Galileo system, which can be offered to a limited number of user equipment with controlled access and based on encrypted signals. As a consequence, for multi GNSS-constellation receivers such as the at least one receiving units according to FIG. 11, the larger number of candidate ranging sources originating from all existing GNSS constellations is of no interest since only a sub-set of them, represented by the CS Galileo signals in the proposed example, are really accessible. In that case, offering many additional ranging sources from LEO satellites, having a same access authorization/constraint type as the Galileo CS one could constitute an alternative service similar to the Galileo CS.

Setting up a new GNSS system usually leads to unacceptable costs:

The space segment (satellites) needs to be equipped with units as part of the navigation signal generation chain, with high stability. For example, high stable clocks, such as atomic clocks, whose cost is expressed in 100K€ level, are needed to ensure that a prediction error of clock models computed on-ground remains minimal at an end of a validity period (for example 1 hour for GPS, 100 mn for Galileo).

The ground segment must be equipped with many monitoring stations whose observables (for example code and/or carrier pseudo-ranges) are fed to a central processing unit (for example an Orbit and Synchronization Processing Facility (OSPF) in the case of the Galileo system) responsible for determining prediction models for the satellite clocks but also the satellite orbits. Those prediction models for the orbit and clock constitute the orbit and clock corrections. Finally, the corresponding orbit prediction models are also called orbit corrections or satellite ephemeris. Furthermore, once those models have been derived, it is necessary to upload them to the satellites using Up-Link Stations (ULS), in order to transmit the corresponding navigation message to the user equipment (here the MEO satellites serve as "bent-pipe" from station to user equipment). The density of the monitoring stations influences indirectly the required quality of the clock and orbit prediction models needed to reduce the prediction error to a minimum. The density of the up-link stations will directly influence the duration of the validity period. The more Up-Link Stations, the more often newer orbit and clock correction data can be uplinked to the LEO satellites, and the smaller will be the so-called "aging" of the models. Thus, besides the space segment, the ground segment will also strongly influence the cost of the whole system if this one is meant to provide an accurate positioning for the user equipment.

Thus, the disclosure provides limitations in development and maintenance cost, especially by minimizing the costs for monitoring and dissemination functions.

Furthermore, the present disclosure aims at reducing a contribution of the prediction error of GNSS satellite orbits and clocks, at two positions: firstly, at the level of the LEO satellites which serve as secondary navigation sources, and secondly at the user equipment. It is namely considered that the contribution of the atmosphere (ionosphere, troposphere) is non-existing at LEO satellite level, and that signal processing methods such as the Dual Frequency correction, or correction models for the troposphere effects can significantly reduce the atmospheric contributions at the user equipment. Similarly, new GNSS signal pulse shapes (such as Binary Offset Carrier, BOC) combined with other pre-/post processing methods enable one to reduce the effects of thermal noise, local RFI and multipath at LEO or at the user equipment. The most important contribution to the LEO and to the final user equipments position error remains the prediction errors for the satellite orbits and clocks.

Figure 2:
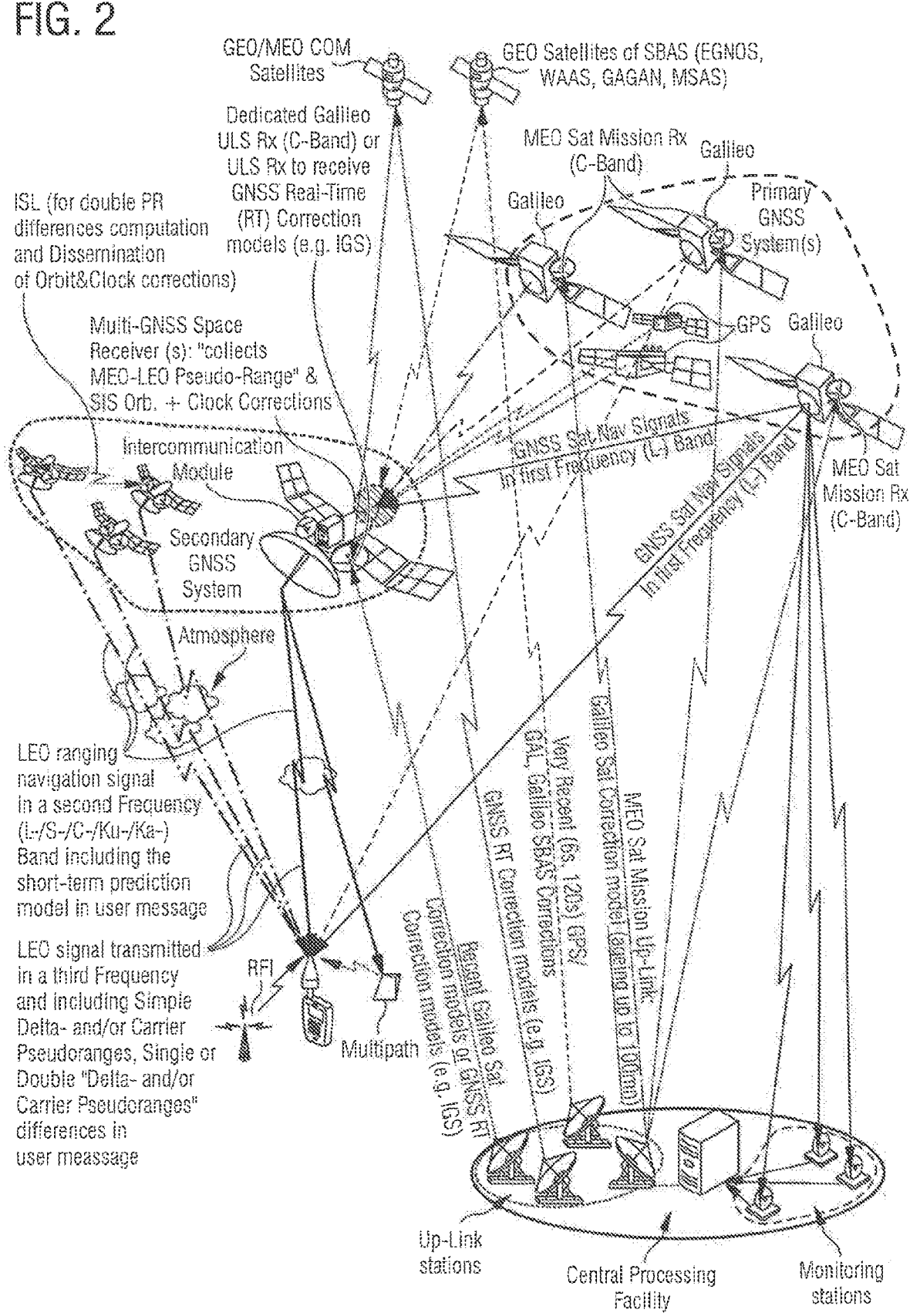
FIG. 2 schematically illustrates a LEO Secondary GNSS-Constellation combined with Primary GNSS System(s)

FIG. 2 illustrates a LEO Secondary GNSS-Constellation combined with Primary GNSS System(s).

The multi-GNSS receiver will be in charge of calculating in real time the satellite position, and time (relative to UTC, see later) at a e.g. 1 Hz rate. The corresponding quasi-instantaneous satellite positions and time are then provided to an On-Board Computer Unit (OBCU) in charge of deriving a prediction model (using for example a Keplerian model with additional orbit correction parameters for the orbit and a polynomial model for the clock offset) for the LEO satellite orbit and clock. Such prediction models can have a same format as typical models described in Signal-In-Space Interface Control Documents (SIS-ICD) and used by conventional GNSS constellations in order to reduce the impact onto the user equipment which will then implement the same method to apply the corrections to the pseudo-ranges of the conventional GNSS signals or to the pseudo-ranges of the LEO signals. Alternative prediction models for the orbits and for the clock of the LEO satellites might also need to be proposed when considering the specificity of the corresponding low-altitude orbits and on-board clocks. Hence, alternative orbit models can consider simplified ephemeris having less Keplerian and orbit correction parameters, or can consider the same number of Keplerian and orbit correction parameters but requiring a smaller number of bits used for their coding as a consequence of different LEO satellite altitude, and the possible smaller validity period, for example 10s or 5 mn. Alternative orbit models can also simply encompass the coordinates of LEO satellite position estimated at each epoch, e.g. every second. In that case no ephemeris (i.e. Keplerian parameters) are transmitted. Alternative clock models can consider a polynomial of different order than the quadratic polynomial proposed for the GNSS on-board clocks, either because the stability of the on-board timing sub-system is worse and then necessitates a higher order for the same validity period, or because the validity period is much smaller, for example, 10 s or 5 mn in which case a lower order will be necessary.

The prediction models are then encoded into a navigation message sent to the user equipment via the navigation signals whose carrier frequency is part of the frequency bands allotted to the Radio Navigation Satellite Service (RNSS) or Radio Determination Satellite Services (RDSS) in an ITU regulatory framework, or frequency bands shared with other non-positioning service but still susceptible to provide a positioning or localization solution. This "user signals LEO frequency" could be for example L-Band currently used by most of the actual GNSS and RNSS systems, C-Band with frequency between 5010 and 5030 MHz, or S-Band with frequency between 2483.5 and 2500 MHz. Frequency bands such as Ku-/Ka-Band, could also be envisaged. The signal using the "user signals LEO frequency" can be used for ranging and also to disseminate the short-term navigation message, and possibly together with additional data such as Delta code and/or carrier pseudo-ranges, and/or simple Delta code pseudo-ranges and/or double Delta code pseudo-ranges.

Transmitting the navigation message in L-Band from LEO has the advantage to not require any significant hardware modification for the user equipment which could re-use the same front-end for the reception of the signals transmitted by the LEO satellites as the ones transmitted by the MEO satellites. The main drawback is that if the LEO satellite receives signals from the primary GNSS satellites and transmits signals to the user equipment in the same frequency band, the power level imbalance between both signal types could yield to strong cross-talk effects which could degrade or even hinder the reception of the primary GNSS satellite signals with the on-board multi-GNSS receiver. Now, some mitigation solutions exist to ensure a sufficient isolation between the transmitting and receiving equipment, for example by installing both equipment on two opposite panels of the LEO spacecraft which will serve as power attenuator.

If the LEO signals are transmitted in S-/C- or (Ku-/Ka-) bands different to the L-Band of the conventional GNSS constellations, there is no risk of RF cross-talk between reception of the "MEO-GNSS" L-Band signals and transmission of the "LEO-GNSS" S-/C-/Ku-/Ka-band signals. It is important to point out that if the GNSS primary systems use alternative frequency bands than the L-Band, such as the S-band for the Indian Regional Navigation System (IRNSS), then the LEO satellites shall transmit in another frequency band than the S-Band to avoid again RF cross-talks. Another advantage of the transmitting in another frequency band in comparison to L-Band, beside the cross-talk aspect, is that if interferers affect the reception in L-Band, then the reception of the LEO signals in another frequency band shall not be affected, improving the resilience of the positioning service.

The main driver for the validity period of the correction model generated by the LEO satellite corresponds to the availability of the position fix from the at least one receiving units due to a possible lack of primary GNSSs' satellite visibility. Assuming for example visibility gaps of e.g. 5 mn, the validity period of the on-board generated clock and orbit models shall be at least 5 mn.

Thus, the satellite can be equipped with one or more GNSS antennas connected to the at least one receiving units or one or more multi-GNSS receiving units equipped each with its own antenna. The antennas could be mounted on the different satellite panels to maximize primary GNSS satellite visibility. Using a LEO platform typically flying between 200 and 2000 km has the advantage that the antenna(s) of the at least one receiving units can see multiple MEO satellites (GPS, Galileo, Glonass, etc.), when it is mounted on a "Back-panel" of the LEO satellite.

An alternative variant based on-board Precise Orbit Determination (POD) algorithms can also be used to "fill the MEO visibility gaps", to still ensure availability of the orbit prediction models, even with lower accuracy, during those periods of time without visibility.

Visibility gaps are avoided by a sufficient number of ranging sources to satisfy an accurate position of the LEO satellite which is also facilitated by a larger number of antennas having complementary views of the geometry for the primary GNSS constellations.

In case the secondary GNSS using LEO satellite is slaved to a single primary GNSS system, then the system time of this secondary GNSS is the same as the one of the primary one. Indeed, the clock correction models disseminated by the primary system enable one to retrieve the system time of the primary system: for example, the Galileo System Time (GST) in case the primary system is Galileo, or the GPS System Time (GPST) in case the primary system is GPS.

In case the secondary GNSS computes its position and time based on the reception of signals originating from multiple primary GNSS systems, for example from both GPS and Galileo systems, then the system time of the secondary GNSS is a common system time to all different primary systems. If a parameter represents an offset between the different primary systems, such as the Galileo-GPS System Time (GGTO) it is possible to relativize the clock corrections provided by both GNSS systems, and to adopt either the GPST or the GST as system time for the secondary GNSS. If no parameter represents the offset between the time scales of the primary systems, then a common system time to all systems could be the Universal Time Coordinate (UTC). All GNSSs provide effectively an offset in their respective navigation messages which enables one to retrieve the UTC.

The PVT determination on-board the LEO satellite, here referred to as satellite of a secondary GNSS in a Low Earth Orbit, LEO, is performed at a high rate (for example every second). Because the availability of a sufficient number of LOS satellites of the primary GNSS systems can be guaranteed, for example by having several GNSS antennas on the LEO satellite, it is possible to use clocks for a timing sub-system responsible of the navigation signal generation with a good stability only at short-term, and not for mid- or long term. Here Quartz oscillators such as (VC)TCXO or USO (OCXO) can be used. Thus, the satellites could be equipped with timing sub-systems using quartz oscillators different to atomic clock technology and which would result in lowering the cost of the LEO satellite payload.

The at least one receiving units can "discipline" their on-board clock with a time estimate calculated from the received GNSS signals. This could for example be a (VC) TCXO GNSS disciplined clock which is steered regularly, and which will serve as timing sub-system for the LEO satellite. The timing sub-system can be used for the signal generation chain on-board the LEO satellite and to discipline this one with the time scale obtained from the PVT calculation. This timing sub-system would then serve for the generation of the LEO navigation message (via PPS and RF output) which are then transmitted in the "user signals LEO frequency", such as the L-/S-/C- or (Ku-/Ka-) frequencies. Another advantage to discipline the on-board timing sub-system with the common system time of the at least one primary GNSS system is that the predicted clock offset between the system time and the on-board clock, timing sub-system, will not exceed the number of bits allocated in the SIS-ICD of the current GNSS message structure to encode the coefficients for the clock correction model. Without disciplining, since the on-board clock is free-running, then the number of bits available in the current GNSS message structure to encode the aforementioned predicted offset might not be sufficient and an overflow effect might occur. Therefore, in that situation a much larger number of bits, not foreseen in the SIS-ICD of the current GNSS message, might be required which will penalize the effective data throughput required to disseminate the LEO correction information with the LEO user signals and also avoid re-use of the SIS-ICD of the current GNSS message.

The LEO satellites can be used as reference (pseudo-) stations. Therefore, it is mandatory to increase the pseudo-range estimation accuracy and to reduce the positioning error of the LEO satellites to a minimum. An objective of the disclosure comprises therefore to reduce the corresponding contribution of the orbit and clock offset prediction error for the satellites of the primary GNSS systems which is demonstrated to be the largest contribution for the pseudo-range estimation accuracy and position error for a space-borne receiver.

The following table provides the typical orders of magnitudes for the system/satellite contributions (satellite orbit and clock estimation errors), the atmospheric contributions (ionosphere, troposphere) and the local contributions (interferences, multipaths) which will impact the pseudo-range estimation accuracy for a terrestrial user equipment.

| Category | Contribution | Value [m] | Comment |
| --- | --- | --- | --- |
| System/satellite | Orbit | 1-3 | Depends on the aging of the orbit ephemeris used to corrected PR |
|  | Clocks | 1-5 | Depends on the aging of the clock ephemeris used to corrected PR |
| Propagation | Ionosphere | 0-10 | Depends on user position (equatorial zones will show higher ionospherical activity) |
|  | Troposphere | 0-2 |  |
| Local Contribution | Noise and Interferences | 1-2 | Depends on the actual RFI levels |
|  | Multipath | 0-2 | 0 if no Multipath |

Since no ionospheric or atmospheric contributions are applicable at a LEO satellite receiver, and assuming that no multipath or RFI applies at the platform (or assuming that dedicated mitigation techniques enable one to reduce significantly the corresponding multipath and RFI contributions) the remaining and most significant contribution to the LEO satellite position error originates from the contribution of the orbit and clock offset prediction of the satellites belonging to the primary GNSSs. This immunity of the ranging and positioning performances against atmospheric, RFI and multipath effects when applying a spaceborne platform as the one of LEO satellites is an important differentiator w.r.t. to other solutions proposed with terrestrial or airborne (such as balloons) platforms. This differentiator will also help using the LEO satellites as reference stations, as described in this disclosure. It means that the prediction accuracy for the orbit and clock of the satellites belonging to the primary GNSS system might propagate to the estimation accuracy of the orbits and clocks of the LEO satellites belonging to the secondary GNSS system. In the example of the Galileo system, the prediction error for the satellite orbit and clock parameters is called Signal-In-Space-Accuracy (SISA) and can be up to 85 cm, for a validity period of 100 mn. As a matter of fact, up to 85 cm of LEO position accuracy will itself "propagate" to the user equipment position accuracy.

To reduce the contribution of the orbit and clock offset prediction error of the primary GNSS satellites a dedicated algorithm aiming at selecting the corrections for the satellites of the primary GNSS system to be applied to the measured code/and carrier pseudo-ranges and ensuring in that way the smallest LEO satellite position error is described hereinbelow.

The actual amplitude of the residual error originating from the GNSS satellite orbit and clock errors strongly depends on:

The aging of the data set used for the position estimation, and therefore the validity period. The older the aging of the set of corrections, the higher the prediction error of the primary satellites' positions. This will therefore impact the position estimation of the secondary satellites' positions.

The requirements regarding the estimation and prediction error of the position for the primary satellite position computed over the whole validity period of the corrections of the primary GNSS satellites, and especially at the end of the corresponding validity period. According to the GNSS type the targeted estimation/prediction error is not identical. This one effectively strongly depends on the position service proposed to the terrestrial users.

Figure 3:
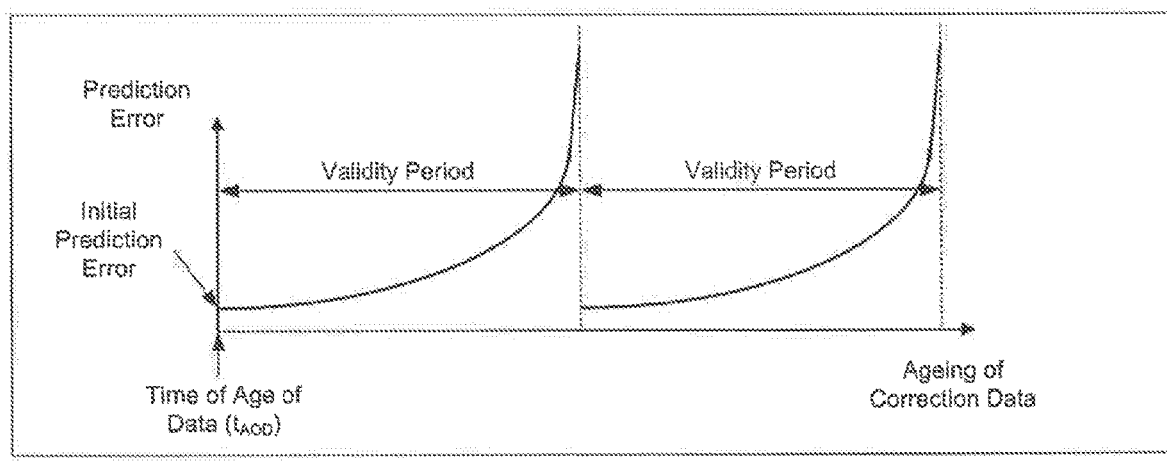
FIG. 3 schematically illustrates a typical "profile" for a prediction error of a primary satellite's position, as function of the aging of the model.

FIG. 3 illustrates a typical "profile" for a prediction error of a primary satellite's position, as function of the aging of the model.

At the end of the validity period, the corresponding prediction error usually increases steeply, which hinders the use of the corresponding set of data for a period exceeding the nominal validity period. The receiver has to apply another set of data for the following period of time (also illustrated on the right side of FIG. 3).

FIG. 3 also highlights that even for a zero aging (meaning that the correction has just been issued and made available to the GNSS receiver), the prediction error might not be null. For example, because the prediction model for the satellite orbit was not calculated when considering all forces applicable onto the satellite, or because limited quantization of the coefficients used in the correction model degrade a prediction precision.

Different ways exist to make the correction models applicable to a satellite of the primary GNSS available to the LEO satellites. For the LEO satellite having an altitude between e.g. 200 to 2000 km the following links can namely be identified for the provision of the correction models for the primary GNSS satellites:

The signal transmitted by the GNSS primary satellites (such as GPS or Galileo satellites) includes user navigation data which can be applied for the pseudo-range correction.

The LEO satellite is able to see on his path several GEO-stationary satellites as components of Space-Based Augmentation Systems (SBAS) used to broadcast corrections to terrestrial or airborne users. Examples of such systems are the European EGNOS, the US WAAS, the Asiatic MSAS. Such augmentations systems aim to ensure a better accuracy than the one provided by the initial Global Navigation Systems that they augment, but also to provide an integrity service which ensures that the position calculated with this additional overlay is reliable (important for safety of life applications). At user level, the orbit and clocks corrections broadcasted by the GEOs of such SBAS have to be combined to the orbit and clocks corrections of the GNSSs they augment. In the following the combination of both correction types is meant for the overall orbit and clocks corrections ensuring higher accuracy with the service provided by the SBAS. The validity period of the orbit and clocks correction disseminated by the GEOS of such SBASs is usually much shorter than the validity period of the orbit and clock corrections of the primary GNSSs satellites. Each SBAS shall provide an accuracy and integrity service on a delimited area, usually as large as a (sub-) continent. This is for example the ECAC for EGNOS or the CONUS (North America) for WAAS. Now, even for a GNSS receiver not located within these service areas, it is still possible to use the additional overlay data transmitted by the GEO-stationary satellites to improve its own position estimation. This is the case for the at least one receiving unit mounted on-board a LEO platform and which is able to receive a signal transmitted by the GEO satellites with its antenna(s).

The orbit and clock corrections of the Galileo satellites could be made directly available to the LEO satellite by mounting on-board the LEO satellite an up-link receiver operating in C-band. This dedicated up-link receiver can be similar to the up-link receiver currently mounted on-board the Galileo satellites.

Further, products offered by providers and dedicated to high accuracy position applications, running in real time, can be used. For such cases, it is possible to use the real-time product of the International GPS geodynamics Service (IGS). Such products are usually made available, on demand, to the user equipment via communication links such as via the internet. Such real-time products could be made available to the LEO satellite under condition that this one is connected with at least one (terrestrial) communication terminal up-loading corresponding models from the aforementioned providers, or with an inter-satellite communication link to another LEO satellite which is itself in contact with one of the at least one communication terminals, or with an inter-satellite communication link to another GEO or MEO communication satellite which is itself in contact with one of the at least one communication terminals.

Thus, the processing unit of each of the LEO satellites can apply different sets of orbit and clock corrections for the same satellite of the primary GNSS constellation.

Figure 4:
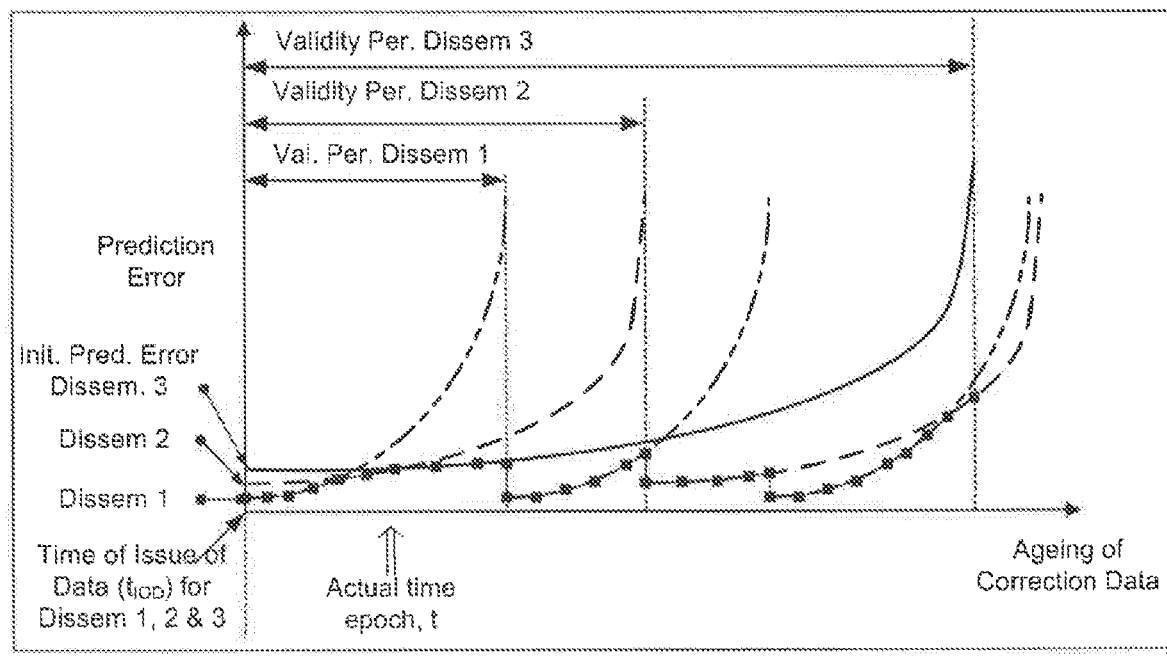
FIG. 4 schematically illustrates different "profiles" for prediction error obtained from different sets of correction models for the same GNSS satellite of the primary GNSSs, and an optimal selection.

FIG. 4 illustrates the profiles for the ranging prediction error obtained by applying different sets of orbit and clock corrections corresponding to different correction models and applied for the same GNSS satellite of the primary GNSSs. For this figure three different sets orbit and clock corrections are proposed for illustration. Each set of orbit and clock correction is obtained by a different dissemination source which can be the signals of the GNSS satellites, the GEO satellites of the SBAS and/or a dedicated up-link to the LEO satellite. FIG. 4 further illustrates the optimal, i.e. minimal, ranging prediction error profile symbolized with a line with square markers, and obtained after correction of the pseudo-range with the optimal set of orbit and clock corrections selected at each time epoch.

In this example, it is assumed that the agings of data for the three dissemination ways are identical for the first validity periods of each of the three dissemination ways, but due to the different values of the respective validity periods, the profiles become rapidly asynchronous. At each time epoch, the "optimal" profile corresponds to the minimum of the three ones and is represented with a line using square markers.

Therefore, the objective is to determine for each satellite of the primary GNSS constellation, the optimal set of orbit and clock corrections among a set of many available. It must be noted that this optimization (selection) might not be performed at each epoch or even not performed periodically. This means that the orbit and clock corrections made available by a given dissemination source can be retained and maintained over a period whose value might depend on the processing capacity of the on-board computer (the more resource available, the shorter is the period).

Another important aspect to consider is the non-constant number of dissemination sources over time, when considering the typical altitude of the LEO satellites. If the orbit and clock corrections modulated onto the navigation signal of the GNSS satellites to be corrected are of course always available, this is not the case of the other dissemination sources:

For example, if the LEO satellite flies over a region covering Atlantic, two Geo satellites are visible from the LEO satellite: one GEO satellite as component of the EGNOS SBAS, and another one as component of the WAAS SBAS. Link analyses show that at LEO side both signals can be received with sufficient quality to demodulate the correction data, here orbit and clock corrections, (applicable to GPS satellite signals). As a consequence, for such a region the LEO will have to choose between two sets of correction data generated by two SBASs. Once the groundtrack of the LEO satellite leaves the Atlantic area and approaches Europe, the connection to the WAAS-GEO satellite ceases and corrections can only be received by the LEO satellite via the EGNOS-GEO satellite. Such a scenario can also happen at other zones, like in the Middle-East where GEO for the MSAS and EGNOS SBASs are also simultaneously visible from the same LEO satellite.

Considering the case of the Galileo system, the mission receivers mounted on-board the Galileo satellite receives from Up-Link stations operating in C-Band the correction models, herein clock an orbit correction, calculated within the Orbit and Synchronization Processing Facility (OSPF) of the Galileo system. Due to the connectivity constraints between Galileo satellites and the network of ULSs, the period between two consecutive contacts can extend for more than one hour. This will of course impact the aging of the data uploaded to the satellite from one ULS before they get refreshed from a next up-load from the next ULS. Therefore, this aging can lead to already presented SISA with a value of up to 85 cm for a receiver making use of the "old" data. To avoid this, the LEO satellite can also comprise an additional payload unit. This may be at least one C-band up-link receiver, also called a dedicated Galileo up-link receiver, similar to a receiver on-board a GEO satellite. This is used for receiving on-board the LEO satellite orbit and clock corrections applicable for the Galileo satellites. Depending on the age of data of a respective message directly demodulated from the Galileo signals or demodulated from transmitted signals to the dedicated up-link receiver on-board the LEO satellite, the processing unit of the LEO satellite is able to choose one or either of the correction sets. It has to be noted that the selection of the optimal set of orbit and clock corrections for the same satellite can also consider other relevant parameters and flags than the Age of Data, when provided in the GNSS signal and which enable one to better discriminate the optimal set yielding the smallest prediction error. In the case of Galileo signals, those parameters are the SISA and the DVS/SHS flags, and in the Case of GPS signals those parameters are the URA.

Figure 5:
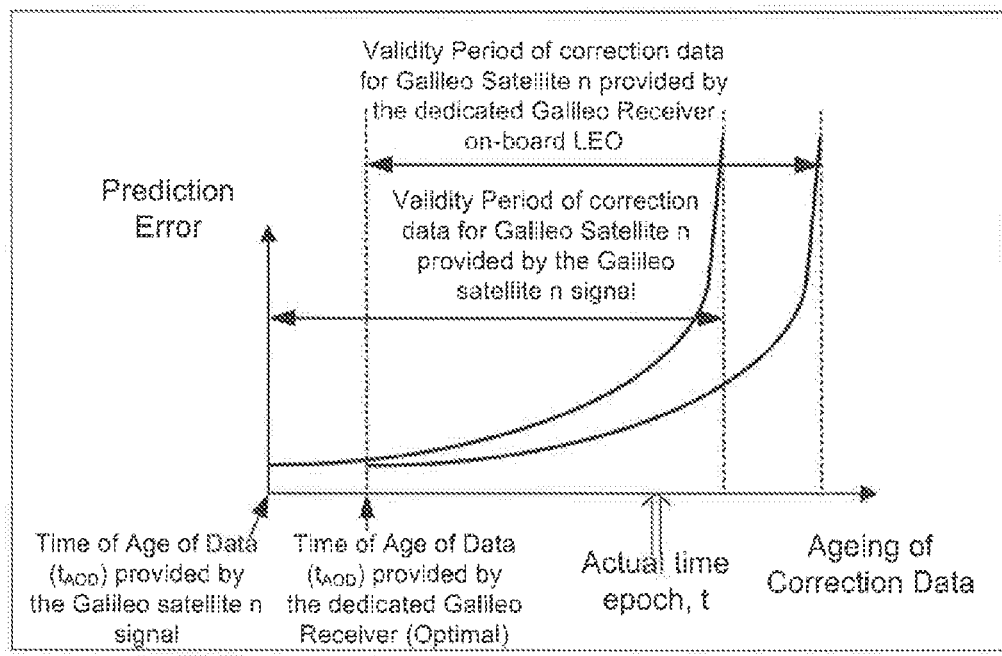
FIG. 5 schematically illustrates the prediction error for the same Galileo satellite n provided either from the Galileo satellite n signal or by at least one of the receiving units on-board the LEO satellite.

FIG. 5 illustrates the prediction error for the same Galileo satellite n provided either from the Galileo n signal or by the at least one dedicated Galileo Up-Link receiver on-board the LEO satellite. It appears that the selection of the optimal set of orbit and clock corrections can be based on AoD, Aging of Correction Data, as shown on FIG. 5, and/or any other ancillary parameters informing on the quality of the prediction error such as the SISA and the DVS/SHS flags for Galileo, or the URA for GPS. In the former example, the corrections provided by the at least one dedicated Galileo Up-Link receiver on-board the LEO satellites are the optimal ones.

The possibility to get the orbit and clock corrections with a dedicated Galileo Up-Link receiver on-board the LEO satellite assumes that the same provider/operator, or a cooperative provider can authorize the Galileo corrections calculated by the OSPF to up-load it to the dedicated up-link receiver on-board the LEO satellites. Therefore, the secondary GNSS shares interfaces with the Galileo system.

For GPS, GLONASS or Beidou systems which are operated by a different provider/operator an alternative comprises using the set of orbit and clock corrections calculated by external services and to make them available to the LEO satellite. This is the case of real-time products (RTP) of the International GPS geodynamics Service (IGS) or the EDAS data service. In that case, dedicated up-link stations (different from the Galileo Mission ULS) can send such RTP data to the LEO satellite equipped with a receiver (different from the dedicated Galileo Up-Link receiver). Other types of orbit and clock correction models are also provided by other providers and usually made available over the internet to the final user. Such alternative models can also be up-loaded to a receiver on-board the LEO satellite. Again, a selection process between the corrections modulated onto the GNSS signals and the ones obtained from the RTP-IGS data can be performed to obtain the optimal set.

Figure 6:
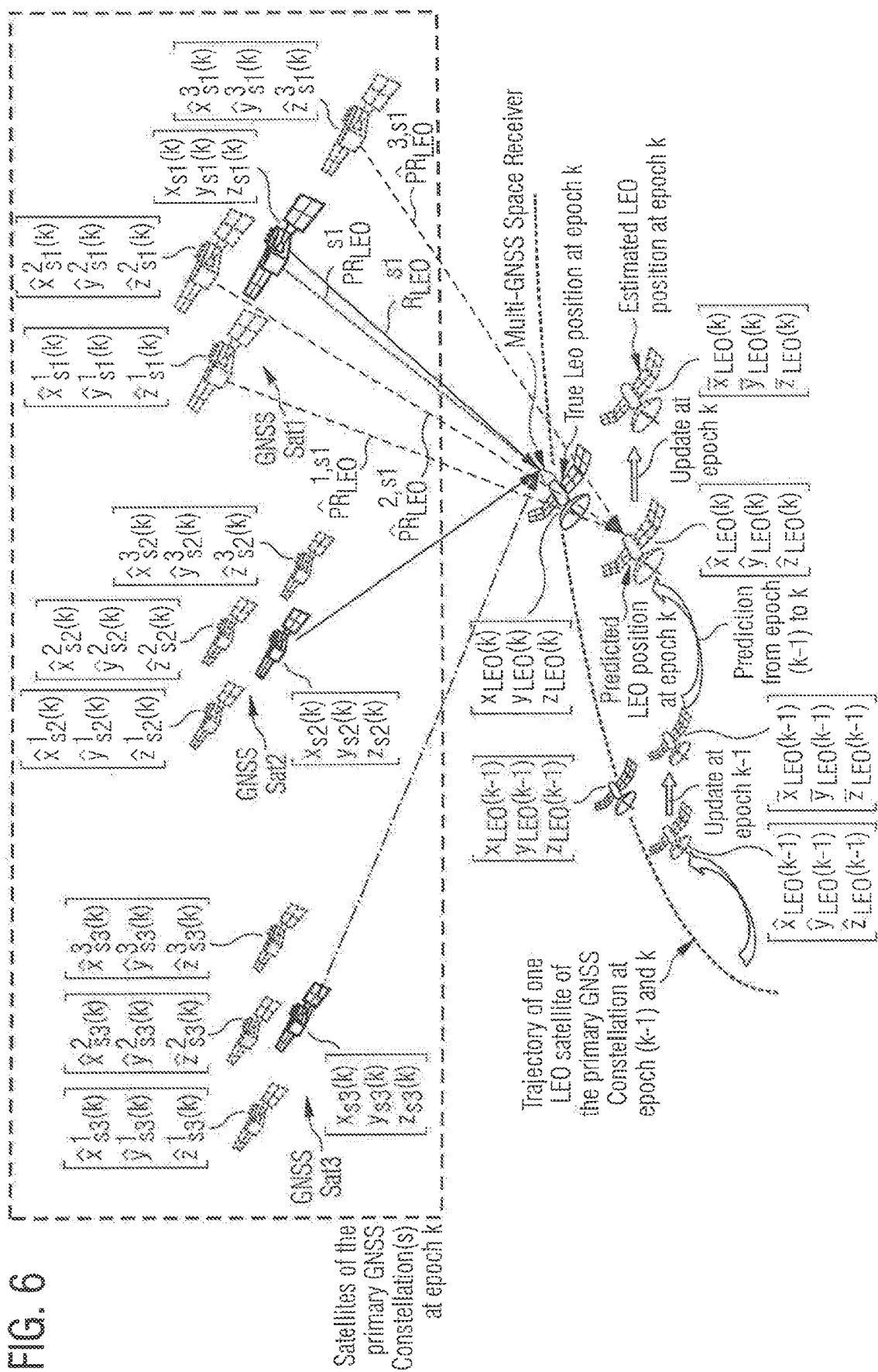
FIG. 6 schematically illustrates a prediction/update process for the LEO satellite position calculation and selection of an optimal set of orbit and clock corrections for satellites of the primary GNSS.

FIG. 6 illustrates a prediction/update process for the LEO satellite position calculation and selection of an optimal set of orbit and clock corrections for satellites of the primary GNSS. FIG. 6 illustrates on the upper part the true and estimated positions for three satellites of the primary GNSS constellation(s) and at epoch (k), and on the lower part, the true/predicted and estimated positions of one LEO satellite of the secondary constellation at epoch (k−1) and (k).

The following notations are applicable:

$[x_{sn}(k)\ y_{sn}(k)\ z_{sn}(k)]^T$ represents the coordinate vector of the true position, at epoch k, of the nth GNSS satellite, belonging to one of the different primary GNSS systems, which are used to evaluate the position of the LEO satellite. In FIG. 6, n=1, 2, 3 satellites are illustrated (for example one satellite could belong to the GPS system, another one to the Galileo system and the third one to the GLONASS system).

$[\hat{x}_{sn}^i(k)\ \hat{y}_{sn}^i(k)\ \hat{z}_{sn}^i(k)]^T$ represents the coordinate vector of the predicted position, at epoch k, of the nth GNSS satellite. Furthermore, different possibilities exist to disseminate the set of orbit corrections for each GNSS satellite n of the GNSS constellation. On this figure the number of different dissemination means is I=3 meaning that each of i=1, 2 or 3 dissemination mean will provide a different set of orbit correction for the nth satellite. Typical orbit corrections are the ones encoded onto the navigation signal of the nth satellite itself, or the corrections from a GEO-SBAS signal, or the Real-Time products calculated by the IGS. In FIG. 6, 3 types have been considered for each satellite. Note that to facilitate the interpretation of the FIG. 6, at each epoch the true GNSS satellite is illustrated with plane colors while the predicted positions are represented with lighter (transparent) colors for each of the 1=3 sets of orbit corrections.

$[x_{LEO}(k)\ y_{LEO}(k)\ z_{LEO}(k)]^T$ represents the coordinate vector for the true position, at epoch k, of the LEO satellite which has to be estimated.

$[\hat{x}_{LEO}(k)\ \hat{y}_{LEO}(k)\ \hat{z}_{LEO}(k)]^T$ represents the coordinate vector for the LEO satellite position predicted for epoch k. This prediction is based on the history of the estimated positions and corresponding GNSS measurements for epochs preceding epoch k. For example, a Kalman filter using physical models to predict the position of the LEO satellite at epoch k and based on the estimated position at epoch (k−1), $[\tilde{x}_{LEO}(k-1) \; \tilde{y}_{LEO}(k-1) \; \tilde{z}_{LEO}(k-1)]^T$, could be used for this purpose.

$[\tilde{x}_{LEO}(k) \; \tilde{y}_{LEO}(k) \; \tilde{z}_{LEO}(k)]^T$ represents the coordinate vector for the LEO satellite position estimated for epoch k. This estimation is based on the predicted position at epoch k, and the actual GNSS measurement (code and/or carrier pseudo-ranges collected at the multi-constellation receiver) at epoch k.

The predicted ($[\tilde{x}_{LEO}(k-1) \; \tilde{y}_{LEO}(k-1) \; \tilde{z}_{LEO}(k-1)]^T$) and estimated ($[\hat{x}_{LEO}(k-1) \; \hat{y}_{LEO}(k-1) \; \hat{z}_{LEO}(k-1)]^T$) LEO satellite positions at epoch (k−1) are also illustrated in FIG. 6. At each epoch, the LEO satellite located at its predicted or estimated position is represented with lighter (transparent) color, while the LEO satellite located at its true position is represented with plane colors. The trajectory of the LEO satellite is depicted with a dashed line. A space multi-GNSS receiver, also referred to as receiving unit comprised by the LEO satellite, is also symbolized by a conus on the rear of the LEO satellite. Here a single antenna is proposed for this illustration.

The "true physical" distance between the LEO and the GNSS (sat 1) satellite is illustrated and labelled $R_{LEO}{}^{s1}$. The measured distance is also illustrated with dashed lines and labelled $PR_{LEO}{}^{s1}$, and is defined in equation (Eq. 18) page 29. The predicted distance between the predicted position of the LEO satellite and the predicted of the GNSS satellite, using the first set of orbit corrections is also represented with long-short dashed lines and labelled $\hat{PR}_{LEO}^{1,s1}$. The predicted distance between the predicted position of the LEO satellite and the predicted of the GNSS satellite, using the second set of orbit corrections is also represented with long-short dashed lines and labelled $\hat{PR}_{LEO}^{2,s1}$. The predicted distance between the predicted position of the LEO satellite and the predicted of the GNSS satellite, using the third set of orbit corrections is also represented with long-short dashed lines and labelled $\hat{PR}_{LEO}^{3,s1}$. See also equation (eq. 19) page 30 for a detailed definition of the corresponding predicted Pseudo-Ranges.

It is considered that a similar algorithm enables one to predict the offset of the on-board LEO clock at epoch (k) based on an estimate of the on-board LEO clock at epoch (k−1), in a similar way to the algorithm for the orbit prediction and estimation. A Kalman Filter can be used for this purpose. The estimate of the on-board LEO clock at epoch (k−1) is called $\hat{\tau}_{LEO}(k-1)$ and is called $\hat{\tau}_{LEO}(k)$ at epoch k. Similarly, the prediction of the on-board LEO clock at epoch (k) is called $\tilde{\tau}_{LEO}(k)$.

In the following, an algorithm used for the selection of an optimal set of orbit and clock corrections for each of the N satellites of the at least primary GNSSs used for the positioning of the LEO satellite is described.

For each satellite n, it is considered that at least I*≥1 sets of corrections are available. Those I* set are called candidate sets of orbit and clock correction.

If different sets of orbit and clock corrections have been generated by the same facility responsible for the ODTS for the same GNSS satellite n, then the set yielding to the smallest prediction error, based on parameters and flags representative of prediction quality, such as the latest AoD and/or the smallest SISA (for Galileo), URA (for GPS) is retained. Taking the example of the Galileo satellites, if 2 different orbit and clock correction inferences for one Galileo satellite are available at the LEO (the first correction inference is directly demodulated from the navigation message of this Galileo satellite, and the second is obtained from a dedicated Galileo up-link receiver mounted on-board the LEO-satellite), then the set having the latest AoD in combination with the smallest SISA/URA is retained for this pair of sub-sets. Here inference means that the same prediction model is used but different values for the corresponding model coefficients are applied due to the different AoDs. This preliminary pre-processing/pre-selection step enables one to reduce the number of applicable and candidate orbit and clock correction sets from I* down to I.

Despite some variability is expected when regarding the renewal of the I correction sets, these ones are not updated at LEO satellite level, at every epoch. Taking the example of the corrections for a Galileo satellite, and provided either by the Galileo satellite signal itself (i=1), or the dedicated Galileo up-link receiving units on-board the LEO satellite (i=2) or the Geo-stationary satellites of the EGNOS system (i=3), then the 3 correction sets can be considered as unchanged over a period T which can encompass several seconds/minutes. Therefore, at each epoch, k, it is proposed to verify if the same number and type of orbit and clock correction sets is applicable as at epoch (k−1). If this is not the case, meaning that a change of the number and type of orbit and clock correction sets occurred, a Set_Change_Status_Flag flag is set to 1. If this is the case, meaning that no change of the number and type of orbit and clock correction sets occurred, then the Set_Change_Status_Flag flag is set to 0 and for each correction set, the aging is calculated, $T_{ageing}{}^{i,sn}(k)$ as illustrated in FIG. 7.

Figure 7:
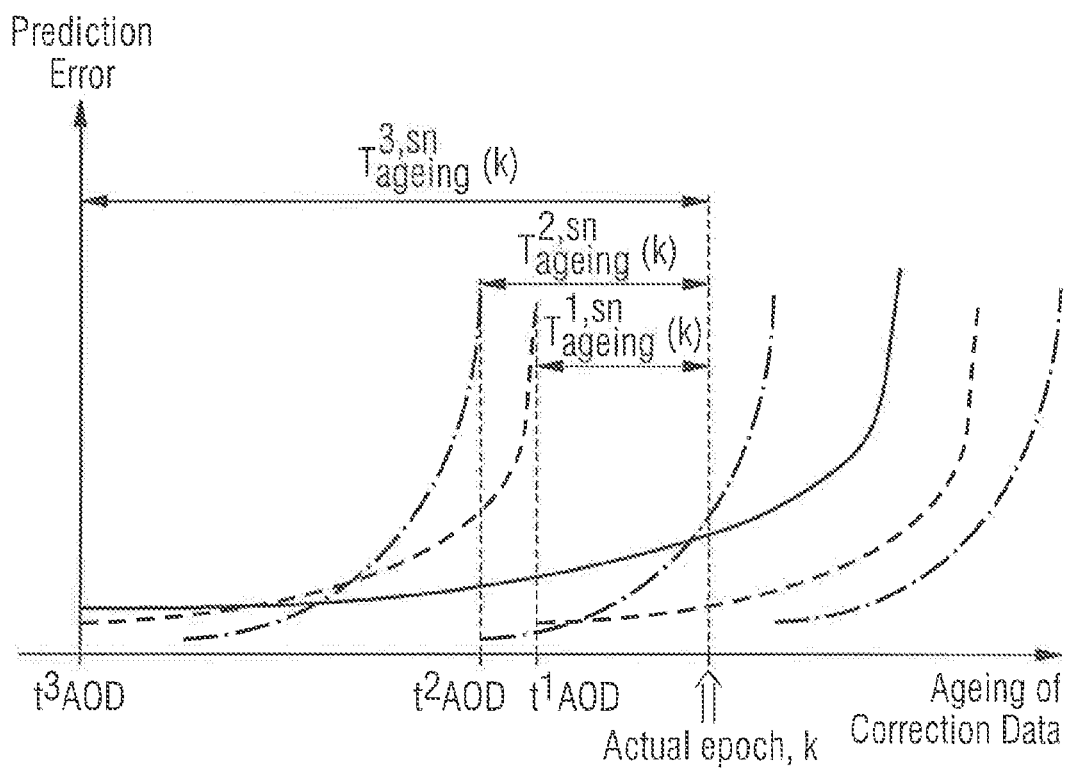
FIG. 7 schematically illustrates a determination of the actual aging of data.

FIG. 7 illustrates a determination of the actual aging of data. Based on I actual aging times, $T_{ageing}{}^{i,sn}(k)$, computed for each of the I sets of orbit and clock corrections, it is possible to determine a common actual aging period, $T_{ageing}{}^{sn}(k)$, as the minimal value of all aging times, as follows:

$$T_{ageing}^{sn}(k) = \min_{i \in [1:I]} \{T_{ageing}^{i,sn}(k)\}, \quad (eq.\ 17)$$

wherein $T_{ageing}{}^{sn}(k)$ represents the shortest aging period applicable for all of the I sets of correction data. In the following, one considers that $T_{ageing}{}^{sn}(k)$ encompasses $K_{ageing}{}^{i,sn}(k)$ epochs. In case Set_Change_Status_Flag=1, then $K_{ageing}{}^{i,sn}(k)=1$, meaning that a re-initialization is to be applied.

If the pre-selection operation applies, it is considered that I≥1 candidate sets of orbit and clock corrections are remaining and the optimal one needs to be selected. For this purpose, one considers that the predicted LEO satellite position $[\hat{x}_{LEO}(k) \; \hat{y}_{LEO}(k) \; \hat{z}_{LEO}(k)]^T$, based on the former history of estimates and measurements is the reference one. This assumption is possible when considering that, on one side, the orbit of the LEO satellite is very stable, and, on the other side, that the models implemented in the On-Board Precise Orbit Determination process for the many different forces exercised onto the LEO satellite represent or are close to the physics (small modelling errors). Furthermore, the multitude constituted by the N Line-of-Sight satellites of the primary GNSSs and used at the epoch (k−1) to estimate the position of the LEO satellite, $[\tilde{x}_{LEO}(k-1) \; \tilde{y}_{LEO}(k-1) \; \tilde{z}_{LEO}(k-1)]^T$, all corrected with the optimal set of orbit and clock corrections for each of the N LoSs enable one to bring an accurate position at epoch (k−1) which will also be the condition to have an accurate position of the prediction at epoch (k).

The pseudo-range between the nth satellite and the LEO satellite based on the code and/or the carrier measurements (assuming carrier ambiguity solved), is given by:

$$PR_{LEO}^{sn}(k) = \sqrt{(x_{sn}(k) - x_{LEO}(k))^2 + (y_{sn}(k) - y_{LEO}(k))^2 + (z_{sn}(k) - z_{LEO}(k))^2} + c_0 \cdot (\tau_{LEO} - \tau_{sn}) + \tau_{LEO,N0}^{sn}(k) \qquad (eq.\ 18)$$

In the former equation, only the thermal noise is considered as degrading contribution, $\tau_{LEO,N0}^{sn}(k)$, to the measured pseudo-range. It is effectively considered that the contribution from local multipath and radio frequency interference is negligible, and the contribution from the atmospheric (ionosphere/troposphere) is nonexistent. The contributions of the hardware group delays are neglected because they are assumed to be calibrated and the corresponding residuals are assumed negligible, and/or because temperature compensation enables one to reduce the thermal excursion of the different signal generation units limiting also the hardware group delay variations. At the end, only the thermal noise contribution therefore remains.

For each index i within the I sets of orbit and clock corrections applicable for the GNSS satellite, n, the predicted pseudo-range at the LEO satellite is calculated as follows:

$$\hat{PR}_{LEO}^{i,sn}(k) = \sqrt{(\hat{x}_{sn}^i(k) - \hat{x}_{LEO}(k))^2 + (\hat{y}_{sn}^i(k) - \hat{y}_{LEO}(k))^2 + (\hat{z}_{sn}^i(k) - \hat{z}_{LEO}(k))^2} + c_0 \cdot (\hat{\tau}_{LEO}(k) - \hat{\tau}_{sn}^i(k)) \qquad (eq.\ 19)$$

Herein, $\hat{x}_{sn}^i(k)$, $\hat{y}_{sn}^i(k)$ and $\hat{z}_{sn}^i(k)$ are the predicted orbit coordinates obtained from the ith set of orbit correction for the GNSS satellite, n, and applied at epoch k. $\hat{\tau}_{sn}^i(k)$ is the predicted time offset obtained from the ith set of clock correction for the GNSS satellite, n, and applied at epoch k. $\hat{x}_{LEO}(k)$, $\hat{y}_{LEO}(k)$ and $\hat{z}_{LEO}(k)$ are the predicted LEO orbit coordinates obtained from the Kalman Filter, processed on-board the LEO satellite, or any other precise orbit determination algorithm which enables one to predict the LEO satellite position without pseudo-range measurements from the GNSS satellites. Although the same terminology is applied, the predicted orbit coordinates, $\hat{x}_{sn}^i(k)$ $\hat{y}_{sn}^i(k)$ and $\hat{z}_{sn}^i(k)$, for the n GNSS satellites, obtained with the ith set of orbit corrections should not be confused with the predicted orbit coordinates, $\hat{x}_{LEO}(k)$ $\hat{y}_{LEO}(k)$ and $\hat{z}_{LEO}(k)$, for the LEO satellite, obtained with the Kalman Filter, or any other precise orbit determination algorithm which enables one to predict the LEO satellite position without pseudo-range measurements. $\hat{\tau}_{LEO}(k)$ represents similarly the predicted time offset for the on-board clock of the LEO satellite, which can also be obtained from a Kalman Filter, or any other clock determination algorithm which enables one to predict the LEO satellite clock without pseudo-range measurements from the GNSS satellites. On FIG. 6, the corresponding predicted pseudo-ranges are labelled, $\hat{PR}_{LEO}^{1,s1}$, $\hat{PR}_{LEO}^{2,s1}$ and $\hat{PR}_{LEO}^{3,s1}$.

Based on the measured Pseudo-Range of (eq. 18) and predicted Pseudo-Ranges of (eq. 19), it is possible to deduce the prediction error of the pseudo-range at the LEO satellite as follows:

$$\Delta \hat{PR}_{LEO}^{i,sn}(k) = PR_{LEO}^{sn}(k) - \hat{PR}_{LEO}^{i,sn}(k) \qquad (eq.\ 20)$$

For the selection of the optimal set $i_{opt}^{sn}(k)$ at epoch k among the I sets available at epoch k it is proposed to take into account the prediction error of the pseudo-range at current epoch but also over the last epochs covering the common aging period $T_{ageing}^{sn}(k)$. The expression for $i_{opt}^{sn}(k)$ is deduced as follows:

$$i_{opt}^{sn}(k) = \min_{i \in [1:I]} \left\{ \sum_{l=0}^{K_{ageing}^{sn}(k)-1} \omega_l \times \left| \Delta \hat{PR}_{LEO}^{i,sn}(k-l) \right|_{norm} \right\} \qquad (eq.\ 21)$$

$$\text{with } \sum_{l=0}^{K_{ageing}^{sn}-1} \omega_l = 1$$

In the former equation, ω1 represents weights which are used to increase or reduce the influence of the preceding prediction errors for the selection of $i_{opt}^{sn}(k)$ The case when ω1=1 for 1=0, and ω1=0 else, means that only the current prediction error $\Delta \hat{PR}_{LEO}^{i,sn}(k)$ for epoch k is accounted for the selection of $i_{opt}^{sn}(k)$. $\|_{norm}$ represents either an absolute norm, or a quadratic norm. Again, if Set_Change_Status_Flag=1, $K_{ageing}^{i,sn}(k)=1$, ω1=1, and only the current prediction error is applied for the selection. The former equation means that the optimal set of index $i_{opt}^{sn}(k)$, is the one which minimizes the cumulated and weighted sum of the prediction errors of the pseudo-range over the last $K_{ageing}^{i,sn}(k)$ epochs. It has to be noticed that according to the selected weights ω1 the selection algorithm will favor a candidate set $i_{opt}^{sn}(k)$ showing a prediction error which was lower at beginning of the common aging period $T_{ageing}^{sn}(k)$, meaning 1 close to 1, if the weights ω1 are larger for such indexes 1. Alternatively the selection algorithm will favor a candidate set $i_{opt}^{sn}(k)$ showing a prediction error which is lower at the end of the common aging period $T_{ageing}^{sn}(k)$, meaning 1 close to $(K_{ageing}^{i,sn}(k)-1)$, if the weights ω1 are larger for such indexes 1. Furthermore, when applying the selection algorithm, it is expected that the index $i_{opt}^{sn}(k)$ for the optimal set varies according to the epoch (k). This is, for example, visible on FIG. 4 where the indexing of the set of orbit and clock corrections for the optimal dissemination source varies. Once the optimal set of corrections is obtained at each epoch for each of the N satellites of the primary GNSSs involved in the position of the LEO satellite, $\{i_{opt}^{sn}(k)\}_{n \in [1,N]}$, the corresponding N pseudo-ranges can be corrected with the corresponding N optimal sets. Those N optimally corrected pseudo-ranges serve for the update step in the estimation/calculation process of the LEO satellite position (depicted with an arrow labeled "Update at epoch k" on FIG. 6). Alternatively, the N optimally corrected pseudo-ranges can be used to estimate the position of the LEO satellite in a simple point positioning algorithm, without using the Kalman Filter.

The following equation provides the optimized Delta code pseudo-ranges obtained with the optimal set of orbit and clock corrections, with index $i_{opt}^{sn}(k)$. The corresponding optimal set will help minimizing the residual of the orbit and clock prediction model, $\delta\hat{R}_{0,LEO}^{i_{opt}^{sn}(k)}$.

$$\Delta PR_{LEO}^{Opt,sn}(k) = \hat{R}_{0,LEO}^{sn} - PR_{LEO}^{sn} \quad \text{(eq. 22)}$$

$$\approx \frac{(x_{sn} - \tilde{x}_{0,LEO})}{R_{0,LEO}^{sn}} \cdot \Delta x_{LEO} + \frac{(y_{sn} - \tilde{y}_{0,LEO})}{R_{0,LEO}^{sn}} \cdot$$

$$\Delta y_{LEO} + \frac{(z_{sn} - \tilde{z}_{0,LEO})}{R_{0,LEO}^{sn}} \cdot \Delta z_{LEO} - c_0 \cdot$$

$$\tau_{LEO} - \delta\hat{R}_{0,LEO}^{sn_{opt}^{(k)}} - \tau_{LEO,N0}^{sn}(k)$$

The former method enables one to select at each epoch the optimal set of corrections originating from different dissemination sources, with a total number I*, and this for each satellite of the primary GNSSs. The main consequence is that based on the optimal sets, it is possible to deduce the position of the LEO satellite which minimizes the propagation of the orbit and clock offset prediction error of the primary GNSS satellites onto the secondary GNSS LEO satellites.

In the following, the index $i^{snGNSSP}$, will be used for the set of orbit and clock corrections generated by the ODTS chain of the primary GNSS system P, and also disseminated by the signals transmitted by the satellite n of the GNSS system P. This can be the GPS or the Galileo Global Navigation Systems, or any other Regional Navigation System such as IRNSS, QZSS. For this specific index, the expression of the Delta code pseudo-ranges for each of the N satellites belonging to the same GNSS system is given by:

$$\Delta PR_{LEO}^{snGNSSP}(k) = \hat{R}_{0,LEO}^{snGNSSP} - PR_{LEO}^{snGNSSP} \quad \text{(eq. 23)}$$

$$\approx \frac{(x_{sn_{GNSSP}} - \tilde{x}_{0,LEO})}{R_{0,LEO}^{snGNSSP}} \cdot \Delta x_{LEO} +$$

$$\frac{(y_{sn_{GNSSP}} - \tilde{y}_{0,LEO})}{R_{0,LEO}^{snGNSSP}} \cdot$$

$$\Delta y_{LEO} + \frac{(z_{sn_{GNSSP}} - \tilde{z}_{0,LEO})}{R_{0,LEO}^{snGNSSP}} \cdot \Delta z_{LEO} -$$

$$c_0 \cdot \tau_{LEO} - \delta\hat{R}_{0,LEO}^{snGNSSP} - \tau_{LEO,N0}^{snGNSSP}$$

It must be mentioned that the former Delta code pseudo-ranges of (eq. 23) will usually always be larger than the optimized Delta code pseudo-ranges computed with the optimal index $i_{opt}^{sn}(k)$ of (eq. 22).

$$\Delta PR_{LEO}^{OPt,snGNSSP}(k) \leq \Delta PR_{LEO}^{snGNSSP}(k) \quad \text{(eq. 24)}$$

For example, assuming IGS RT products available at LEO satellites it is probable that the corresponding sets of orbit and clock corrections will provide the lowest Delta code pseudo-ranges computed for the GPS ranging signals, in comparison to the Delta code Pseudo-ranges computed with the set of orbit and clock corrections modulated onto those GPS ranging signals.

The atmospherical contributions are non-applicable at LEO satellites, and the contributions of local radio frequency interference (RFI) and multipath (MP) can be reduced per design to a minimum at LEO spacecraft level. Further, a temperature stability on the signal generation chain combined with an accurate calibration of the hardware group delay can maintain the contribution of the hardware group delay at a sufficient low level. Finally, the optimal selection of the orbit and clock corrections will also minimize the impact of the orbit and clock offset prediction error onto the LEO satellite orbit and clock estimates. Therefore, the contribution of all aforementioned residuals to the LEO orbit and clock offset prediction error can be reduced to a minimum. Thus, the LEO satellites can themselves be considered as very accurate positioning sources, and could play the role of reference "non-stationary" stations. As a consequence, the next step comprises describing how a navigation system based on the LEO satellites can be used to offer a High Accuracy Service for final user equipment making use of a GNSS system P, and also augment the performances of the GNSS P.

At the user equipment level, the Pseudo range error calculated for a satellite n, n for example being 4, of the GNSS P, $\Delta PR_r^{satnGNSSP}$, and obtained after linearization of the pseudo-range equation in the vicinity of the true receiver position is provided by the following equation.

$$\Delta PR_r^{snGNSSP}(k) = \hat{R}_{0,r}^{snGNSSP} - PR_r^{snGNSSP} \quad \text{(eq. 25)}$$

$$\approx \frac{(x_{sn_{GNSSP}} - \tilde{x}_{0,r})}{R_{0,r}^{snGNSSP}} \cdot \Delta x_r +$$

$$\frac{(y_{sn_{GNSSP}} - \tilde{y}_{0,r})}{R_{0,r}^{snGNSSP}} \cdot$$

$$\Delta y_r + \frac{(z_{sn_{GNSSP}} - \tilde{z}_{0,r})}{R_{0,r}^{snGNSSP}} \cdot \Delta z_r -$$

$$c_0 \cdot \tau_r - \delta\hat{R}_{0,r}^{snGNSSP} - \tau_I^{snGNSSP} -$$

$$\tau_T^{snGNSSP} - \tau_{RFI}^{snGNSSP} - \tau_{MP}^{snGNSSP} -$$

$$\tau_{N_0}^{snGNSSP}$$

This equation also highlights the contributions for all perturbing contributions at user side:

Herein, the following variable description applies:

$[x_{sn_{GNSSP}} \; y_{sn_{GNSSP}} \; z_{sn_{GNSSP}}]^T$ represents the coordinate vector of the true position of satellite sat n of the GNSS P.

$[\hat{x}_{sn_{GNSSP}} \; \hat{y}_{sn_{GNSSP}} \; \hat{z}_{sn_{GNSSP}}]^T$ represents the coordinate vector of the predicted position of satellite sat n of GNSS P and which is usually computed (estimated) based on models computed in the central processing facility of a navigation system GNSS P and encoded onto the corresponding navigation signal.

$[x_r \; y_r \; z_r]^T$ represents the coordinate vector of the true receiver/user equipment to be estimated.

$[\dot{x}_{0,r} \; \tilde{y}_{0,r} \; \tilde{z}_{0,r}]$ represents the coordinate vector of the rough estimation of the receiver position around the true receiver/user equipment position.

$[\tilde{x}_r \; \tilde{y}_r \; \tilde{z}_r]$ represents the coordinate vector of the estimation of the receiver/user equipment position $R_r^{snGNSSP}$ represents the true geometrical distance between the true position of satellite sat n of the GNSS P and receiver/user equipment position.

$PR_r^{snGNSSP}$ represents the pseudo-range measurement between the satellite sat n of the GNSS P and receiver/user equipment.

$R_{0,r}^{snGNSSP} = \sqrt{(x_{sn_{GNSSP}} - \tilde{x}_{0,r})^2 + (y_{sn_{GNSSP}} - \tilde{y}_{0,r})^2 + (z_{sn_{GNSSP}} - \tilde{z}_{0,r})^2}$ represents the distance between the true position of satellite sat n of the GNSS P and the rough receiver/user equipment position.

$\hat{R}_{0,r}^{snGNSSP} = \sqrt{(\hat{x}_{sn_{GNSSP}} - \tilde{x}_{0,r})^2 + (\hat{y}_{sn_{GNSSP}} - \tilde{y}_{0,r})^2 + (\hat{z}_{sn_{GNSSP}} - \tilde{z}_{0,r})^2}$ represents the distance between the predicted position of transmitting satellite sat n of the GNSS P and the rough receiver/user equipment position.

$\Delta x = x_r - \tilde{x}_{0,r}$, $\Delta y = y_r - \tilde{y}_{0,r}$ and $\Delta z = z_r - \tilde{z}_{0,r}$ represent the difference coordinates between the actual position of the receiver/user equipment and the rough estimate position of the receiver/user equipment.

$\delta \hat{R}_{0,r}^{sat\ nGNSSP} = \delta \hat{R}_{0,r}^{orb,sat\ nGNSSP} - c_0 \cdot \delta \hat{\tau}_{sat\ nGNSSP}$ is the combined contribution of the orbit prediction and clock offset prediction errors for the satellite sat n of the GNSS P. The contribution of the orbit prediction error for the satellite sat n of the GNSS P onto the pseudo-range can be itself written as $$\delta \hat{R}_{0,r}^{orb,sat\ nGNSSP} = \frac{1}{\hat{R}_{0,r}^{sat\ nGNSSP}} \begin{bmatrix} (\hat{x}_{sat\ nGNSSP} - \tilde{x}_{0,r}) \cdot \\ (\hat{x}_{sat\ nGNSSP} - x_{sat\ nGNSSP}) + \\ (\hat{y}_{sat\ nGNSSP} - \tilde{y}_{0,r}) \cdot \\ (\hat{y}_{sat\ nGNSSP} - y_{sat\ nGNSSP}) + \\ (\hat{z}_{sat\ nGNSSP} - \tilde{z}_{0,r}) \cdot \\ (\hat{z}_{sat\ nGNSSP} - z_{sat\ nGNSSP}) \end{bmatrix}$$

It is equal to the inner product between the prediction error of position for the satellite sat n of GNSS P and the normalized predicted satellite to rough receiver/user equipment position.

τr represents the receiver clock offset evaluated at time of reception.

$\delta \hat{\tau}_{sn_{GNSSP}} = (\tau_{sn_{GNSSP}} - \hat{\tau}_{sn_{GNSSP}})$ represents the prediction error for the clock offset of satellite sat n of GNSS P.

$\tau_I^{snGNSSP}$ represents the contribution of the Ionosphere onto the propagation delay for LoS corresponding to satellite sat n of GNSS P.

$\tau_T^{snGNSSP}$ represents the contribution of the Troposphere onto the propagation delay for LoS corresponding to satellite sat n of GNSS P.

$\tau_{MP}^{snGNSSP}$ represents the contribution of the local Multipath onto the estimation of the propagation delay for LoS corresponding to satellite sat n of GNSS P.

$\tau_{RFI}^{snGNSSP}$ represents the contribution of the local Radio Frequency Interferences (RFI) onto the estimation of the propagation delay for LoS corresponding to satellite sat n of GNSS P.

$\tau_{N_0}^{snGNSSP}$ represents the contribution of the thermal noise for LoS corresponding to satellite sat n of GNSS P.

The generic Least Square method can be used to estimate the receiver position (xr, yr, zr) and time offset τr, based on the pseudo-range measured by at least four LOS satellites of the primary GNSS. However, other methods such as Monte-Carlo or gradient descent may be applicable.

The following contributions can be reduced and neglected in the expression of the Delta code pseudo-range $\Delta PR_r^{snGNSSP}$ (eq. 25), when it is applied at end-user level:

The contribution of the local thermal noise ($\tau_{N_0}^{snGNSSP}$), local RFI ($\tau_{RFI}^{snGNSSP}$) and multipath ($\tau_{MP}^{snGNSSP}$) can be reduced based on more robust GNSS pulse shapes (such as BOC) and/or pre-/post processing methods.

The contribution of the ionosphere ($\tau_I^{snGNSSP}$) can be reduced by ionospherical delay, or the combination of the pseudo-ranges measured with two frequencies, such as in L1 or L5, and using the dual-frequency ionospherical correction.

The contribution of the troposphere ($\tau_T^{snGNSSP}$) can be reduced by tropospherical models.

Based on these assumptions, (eq. 25) reduces to the following equation, (eq. 26), where $\varepsilon_{res}^{snGNSSP}$ represents the residual of the corrections for the Ionosphere, Atmosphere, Multipath, RFI and thermal noise disturbance parameters. Here, it has to be highlighted that $\varepsilon_{res}^{snGNSSP}$ does not encompass the contribution for the orbit and clock offset prediction errors for the satellite n of GNSS P, $\delta \hat{R}_{0,r}^{snGNSSP}$.

$$\Delta PR_r^{snGNSSP} \approx \frac{(x_{sn_{GNSSP}} - \tilde{x}_{0,r})}{R_{0,r}^{snGNSSP}} \cdot \Delta x_r + \frac{(y_{sn_{GNSSP}} - \tilde{y}_{0,r})}{R_{0,r}^{snGNSSP}} \cdot \Delta y_r + \quad \text{(eq. 26)}$$
$$\frac{(z_{sn_{GNSSP}} - \tilde{z}_{0,r})}{R_{0,r}^{snGNSSP}} \cdot \Delta z_r - c_0 \cdot \tau_r - \delta \hat{R}_{0,r}^{snGNSSP} + \varepsilon_{res}^{snGNSSP}$$

The remaining contributions which need to be compensated are the residual for the satellite orbit prediction error $\delta \hat{R}_{0,r}^{orb,snGNSSP}$, and satellite clock offset prediction error $\delta \hat{\tau}_{sn_{GNSSP}}$ included into the term $\delta \hat{R}_{0,r}^{snGNSSP}$. To reduce such contributions, it is proposed to disseminate to the end-user equipment the $\Delta PR_{LEO}^{snGNSSP}$ measured at each LEO satellite position. One solution comprises modulating such information onto the signal transmitted in the "user signals LEO frequency" (e.g., L-/S-/C-/Ku-/Ka-band), or alternatively to use a dedicated communication link between the LEO satellite and the user equipment, or finally to disseminate this information from the LEO to a ground station and then to the user equipment via a terrestrial link. For an end-user equipment operating in the typical L-Band, this information could then be used to correct and reduce $\Delta PR_r^{snGNSSP}$ received in the L-Band. This helps to reduce the effects of ODTS estimation error for the orbit and clock of the satellite n belonging to the primary GNSS system P. On top of the $\Delta PR_{LEO}^{snGNSSP}$, additional information regarding the position of the LEO satellite, $[\tilde{x}_{LEO}(k)\ \tilde{y}_{LEO}(k)\ \tilde{z}_{LEO}(k)]^T$, and the LEO satellite clock, $\tilde{\tau}_{LEO}(k)$, at each epoch k needs also to be disseminated to the end-user equipment. Such LEO orbit and clock information are part of the navigation message modulated onto a LEO navigation signal and using the "user signals LEO frequency" (e.g. L-/S-/C-/Ku-/Ka-band), as described earlier. Alternatively, such LEO orbit and clock information can also be disseminated in a dedicated communication link between the LEO satellite and the user equipment, or finally can also be disseminated from the LEO to a ground station and then to the user equipment via a terrestrial link.

This principle is similar to the one currently applied in Differential GPS systems or RTK positioning systems, having a network of terrestrial reference stations, which compute the pseudo-ranges with respect to the GNSS satellites and provide them to the final user via a communication link. The main difference resides in the fact that the references stations (i.e., the LEO satellites) are no more stationary but "moving." It is shown that the spatial correlation between the user equipment and the LEO satellites can be achieved when the number of LEO satellites is large enough. This spatial correlation is the fundamental principle for a differential GPS or Real-Time Kinematic positioning.

Figure 8:
FIG. 8 schematically illustrates a network for an exemplary LEO constellation used as secondary GNSS.

FIG. 8 illustrates a network for an exemplary LEO constellation used as secondary GNSS. FIG. 8 represents a similar constellation to OneWeb with 648 satellites flying at an altitude of 1400 km as baseline and constituted of 18 orbitals planes having each 36 satellites.

A large density of flying reference stations can be achieved due to the large number of LEO satellites, which is a condition for the provision of a DGPS or RTK service, using spaceborne platforms. On FIG. 8, a simple baseline constituted of 3 LEO satellites and a terrestrial user equipment, Rx, within this baseline is presented.

Figure 9:
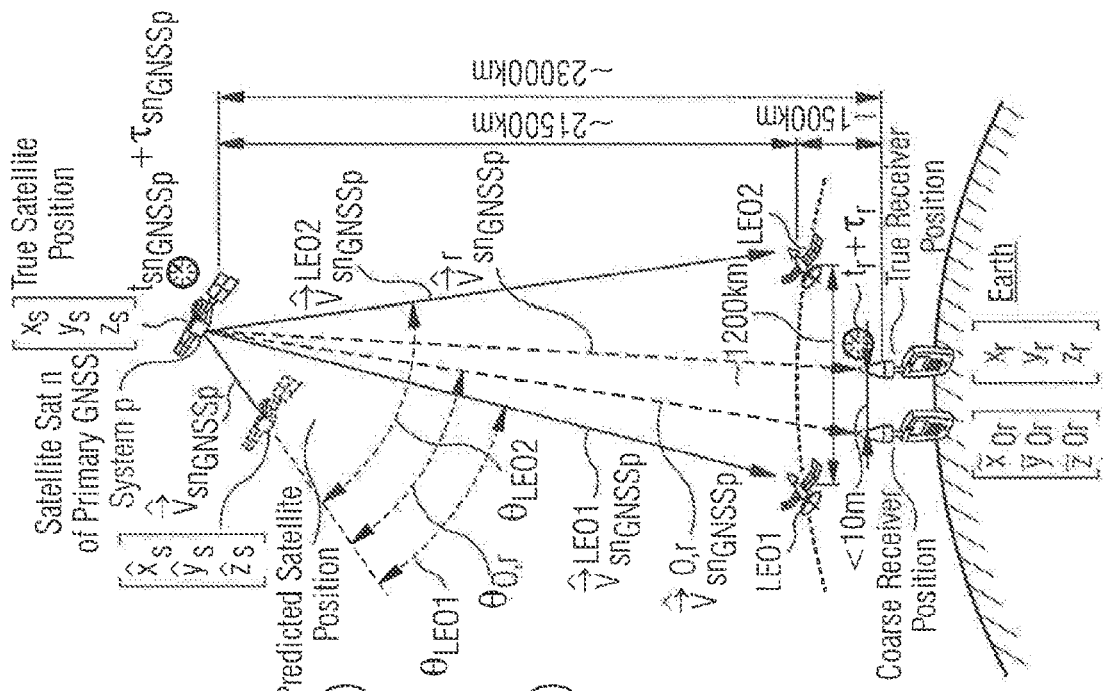
FIG. 9 schematically illustrates spatial correlation for the impact of GNSS satellite orbit residuals at the LEO satellite and the user equipment.

The order of magnitude for the distance between LEO satellites is at maximum of 1200 km. FIG. 9 therefore illustrates the geometrical characteristics of the GNSS satellites belonging to the primary GNSS constellation, for example, a Galileo constellation with a satellite altitude of 23000 km. Two LEO satellites are also represented, at an altitude of ~1500 km.

FIG. 9 illustrates spatial correlation for the impact of GNSS satellite orbit residuals at the LEO satellite and the user equipment.

Furthermore, the vector for the prediction error between the true position of satellite sat n of GNSS P and its predicted position, $\vec{V}_{sn_{GNSSP}}$, is also illustrated, together with the vectors between the true satellite position and 1) the LEO1 true satellite position ($\vec{V}_{sn_{GNSSP}}^{LEO1}$), 2) the LEO2 true satellite position ($\vec{V}_{sn_{GNSSP}}^{LEO2}$), 3) the true user equipment position ($\vec{V}_{sn_{GNSSP}}^{r}$) and 4) the rough user equipment position, used for the linearization of the receiver position ($\vec{V}_{sn_{GNSSP}}^{0,r}$).

The contribution of the prediction error of the GNSS satellite is equal to the inner product between the orbit prediction vector error $\vec{V}_{sn_{GNSSP}}$ of the satellite n of GNSS P, and the normalized $\vec{V}^{0,r}$ vectors, $$\frac{\vec{V}_{sn_{GNSSP}}^{0,r}}{\|\vec{V}_{sn_{GNSSP}}^{0,r}\|},$$

(which can be approximated to the normalized vector between true position of satellite sat n of GNSS P and the true user equipment position, $$\frac{\vec{V}_{sn_{GNSSP}}^{r}}{\|\vec{V}_{sn_{GNSSP}}^{r}\|}\bigg).$$

FIG. 9 also highlights that the contribution of the prediction error of the satellite n of GNSS P, calculated at the user equipment position ($\delta\hat{R}_{0,r}^{sn_{GNSSP}}$), can be approximated to the contribution of the orbit prediction error of satellite n of GNSS P calculated at the LEO1 position ($\delta\hat{R}_{LEO1}^{sn_{GNSSP}}$) or at the LEO2 position ($\delta\hat{R}_{LEO2}^{sn_{GNSSP}}$). This is a consequence of the large distance between the GNSS and the LEO satellites (~21500 km), compared to the much smaller altitude between LEO satellites and the terrestrial user equipment (~1500 km) on one side, and on the other side the small mesh (~1200 km) of the LEO satellite network to which the user equipment projection belongs to. This results in a spatial correlation of the orbit prediction error of satellite n of GNSS P at the user equipment, LEO1 and LEO2 positions.

The following equation provides again the Delta code pseudo-range, of (eq. 23), and measured at LEO1 or LEO2 satellite position, here called generically LEO, and where the contribution for the orbit and clock residual $\delta\hat{R}_{0,LEO}^{sn_{GNSSP}}$ is now called $\delta\hat{R}_{0,LEO}^{sn_{GNSSP}}$ for simplification.

$$\Delta PR_{LEO}^{sn_{GNSSP}} = \hat{R}_{0,LEO}^{sn_{GNSSP}} - PR_{LEO}^{sn_{GNSSP}} \quad \text{(eq. 27)}$$

$$\approx \frac{(x_{sn_{GNSSP}} - \tilde{x}_{0,LEO})}{R_{0,LEO}^{sn_{GNSSP}}} \cdot \Delta x_{LEO} +$$

$$\frac{(y_{sn_{GNSSP}} - \tilde{y}_{0,LEO})}{R_{0,LEO}^{sn_{GNSSP}}} \cdot \Delta y_{LEO} + \frac{(z_{sn_{GNSSP}} - \tilde{z}_{0,LEO})}{R_{0,LEO}^{sn_{GNSSP}}} \cdot \Delta z_{LEO} -$$

$$c_0 \cdot \tau_{LEO} - \delta\hat{R}_{0,LEO}^{sn_{GNSSP}} - \tau_{LEO,N0}^{sn_{GNSSP}}$$

If one considers that the LEO satellite can determine its exact position at any epoch, based on the method aiming at reducing the contribution of the orbit and clock offset prediction error, by the selection of an optimal set of orbit and clock corrections as described earlier in this disclosure, then ($\tilde{x}_{0,LEO}=x_{LEO}$, $\tilde{y}_{0,LEO}=y_{LEO}$, $\tilde{z}_{0,LEO}=z_{LEO}$) and ($\Delta x_{LEO}=0$, $\Delta y_{LEO}=0$, $\Delta z_{LEO}=0$) in $\Delta PR_{LEO}^{sn_{GNSSP}}$. Furthermore, $\tau_{LEO}$ can be replaced by $\tilde{\tau}_{LEO}+\delta\tilde{\tau}_{LEO}$, where $\delta\tilde{\tau}_{LEO}$ represents the estimation error of the clock offset for the LEO satellite. Therefore (eq. 27) can be simplified for the LEO satellite as follows:

$$\Delta PR_{LEO}^{sn_{GNSSP}} \approx -c_0\tilde{\tau}_{LEO} - \delta\hat{R}_{0,LEO}^{sn_{GNSSP}} - \varepsilon_{LEO}^{sn_{GNSSP}} \quad \text{(eq. 28)}$$

In the former expression $\varepsilon_{LEO}^{sn_{GNSSP}}$ encompasses the thermal noise contribution and residual errors for the clock offset estimation, $\delta\tilde{\tau}_{LEO}$, of the LEO satellite and other pseudo-range error contributions such as for local MP and RFI.

Hence by subtracting the $\Delta PR_{LEO}^{sn_{GNSSP}}$ at LEO satellite level, (eq. 28), from the $\Delta PR_r^{sn_{GNSSP}}$ at the user equipment, (eq. 26), yields:

$$\Delta PR_r^{sn_{GNSSP}} - \Delta PR_{LEO}^{sn_{GNSSP}} \approx \quad \text{(eq. 28)}$$

$$\frac{(x_{sn_{GNSSP}} - \tilde{x}_{0,r})}{R_{0,r}^{sn_{GNSSP}}} \cdot \Delta x_r + \frac{(y_{sn_{GNSSP}} - \tilde{y}_{0,r})}{R_{0,r}^{sn_{GNSSP}}} \cdot \Delta y_r +$$

$$\frac{(z_{sn_{GNSSP}} - \tilde{z}_{0,r})}{R_{0,r}^{sn_{GNSSP}}} \cdot \Delta z_r - c_0 \cdot \tau_r - \delta\hat{R}_{0,r}^{sn_{GNSSP}} +$$

$$\varepsilon_{res}^{sn_{GNSSP}} - \left(-c_0 \cdot \tilde{\tau}_{LEO} - \delta\hat{R}_{LEO}^{sn_{GNSSP}} - \tau_{LEO,N0}^{sn_{GNSSP}}\right)$$

$$\Delta PR_r^{sn_{GNSSP}} - \Delta PR_{LEO}^{sn_{GNSSP}} \approx \frac{(x_{sn_{GNSSP}} - \tilde{x}_{0,r})}{R_{0,r}^{sn_{GNSSP}}} \cdot \Delta x_r +$$

$$\frac{(y_{sn_{GNSSP}} - \tilde{y}_{0,r})}{R_{0,r}^{sn_{GNSSP}}} \cdot \Delta y_r + \frac{(z_{sn_{GNSSP}} - \tilde{z}_{0,r})}{R_{0,r}^{sn_{GNSSP}}} \cdot \Delta z_r -$$

$$c_0 \cdot \tau_r + \varepsilon_{res}^{sn_{GNSSP}} - \left(-c_0 \cdot \tilde{\tau}_{LEO} - \tau_{LEO,N0}^{sn_{GNSSP}}\right)$$

Figure 11:
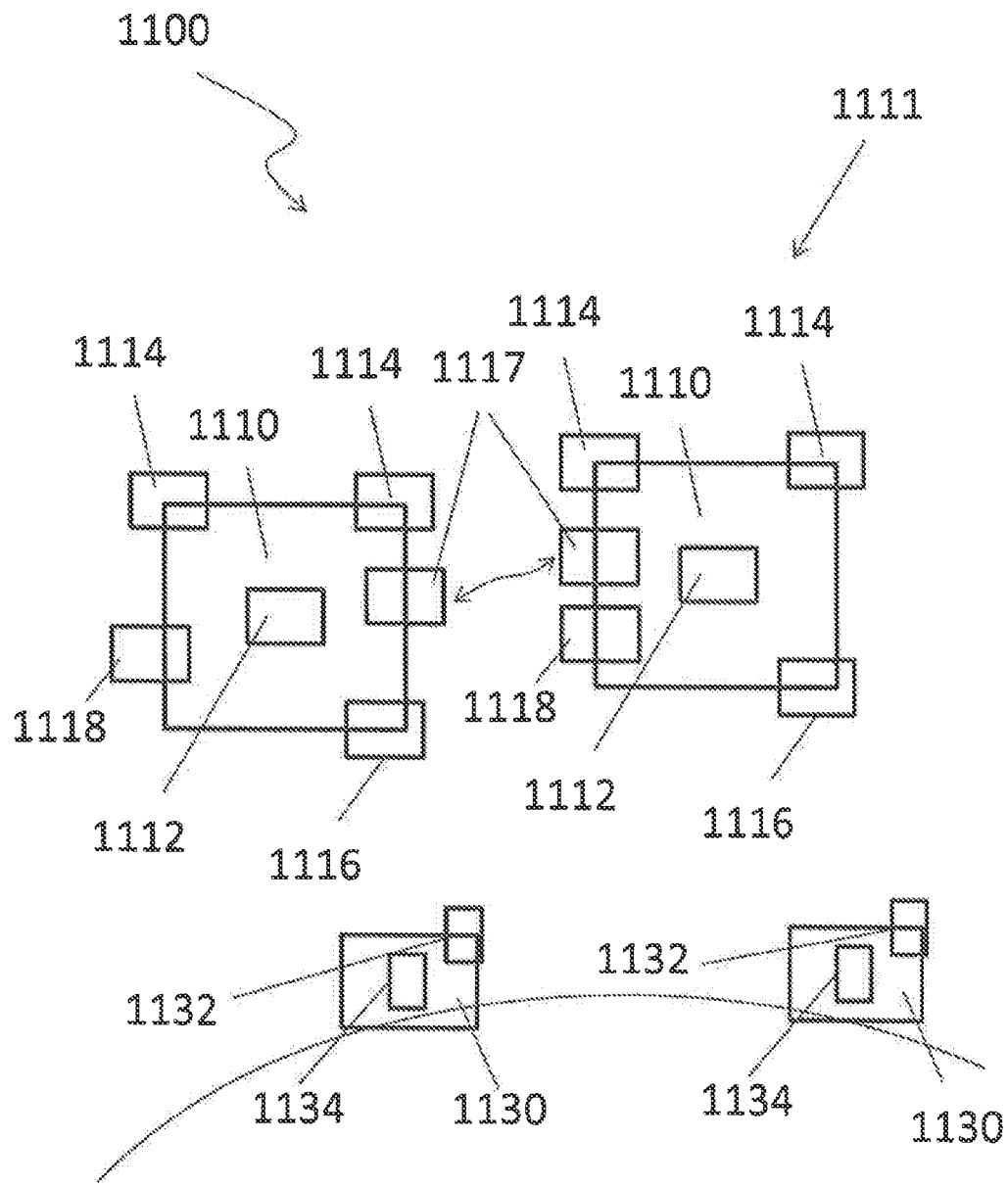
FIG. 11 schematically illustrates a system comprising the secondary GNSS and the terrestrial user equipment.

It can be verified in the former equation that the contribution of the prediction errors for the GNSS satellite orbit and clock offset vanished from the pseudo-range equation, since $\delta\hat{R}_{0,r}^{sn_{GNSSP}} \approx \delta\hat{R}_{0,LEO}^{sn_{GNSSP}}$ based on the former geometrical demonstration of FIG. 11.

Hence at least five Delta code pseudo-range, $\Delta PR_{LEO}^{sn_{GNSSP}}$, are provided to the user equipment, which are measured at the same LEO satellite and for at least five different satellites sat n=n1, n2, n3, n4 and n5 of the same GNSS P enabling to deduce the user unknowns $\Delta x_r$, $\Delta y_r$, $\Delta z_r$ and $\tau r$ and the LEO clock offset $\tilde{\tau}_{LEO}$. If the LEO satellites disseminate their clock offset $\tilde{\tau}_{LEO}$ estimated on-board in addition to Delta code pseudo-range, $\Delta PR_{LEO}^{sn_{GNSSP}}$, then only four user unknowns $\Delta x_r$, $\Delta y_r$, $\Delta z_r$ and $\tau r$ need to be estimated and therefore only four Delta code pseudo-ranges, $\Delta PR_{LEO}^{sn_{GNSSP}}$ measured for at least four different satellites sat n=n1, n2, n3 and n4 of the same GNSS P need to be disseminated to the user. Furthermore, if the LEO satellites disseminate their clock offsets, $\tilde{\tau}_{LEO}$, then the corresponding at least four Delta code pseudo-ranges, $\Delta PR_{LEO1}^{snGNSSP}$, $\Delta PR_{LEO2}^{snGNSSP}$, $\Delta PR_{LEO3}^{snGNSSP}$ and $\Delta PR_{LEO4}^{snGNSSP}$ can be measured by different LEO satellites LEO1, LEO2, LEO3 and LEO4.

Figure 10:
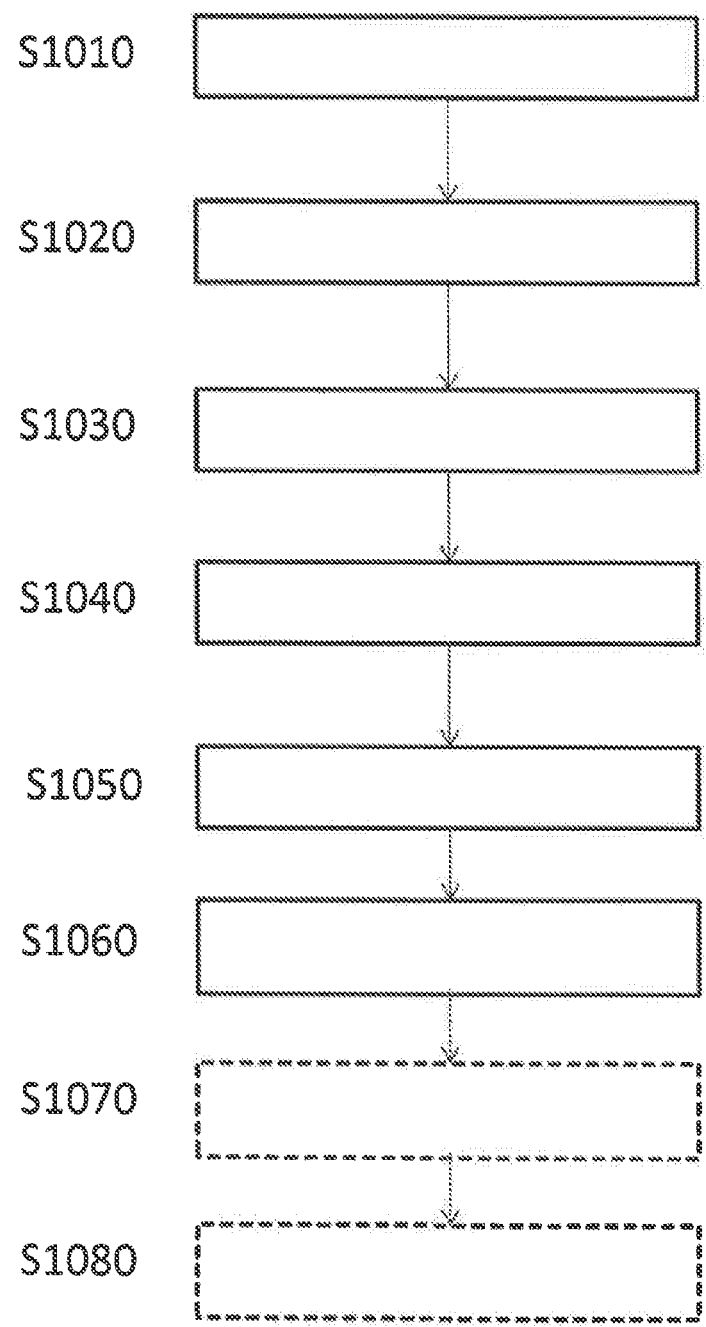
FIG. 10 schematically illustrates a method for each of a plurality of satellites of a secondary Global Navigation Satellite System, GNSS, in a Low Earth Orbit, LEO.

In order to improve the correction of the pseudo-ranges measured at user receiver/equipment level, it is possible to use a spatial interpolation of the Delta code pseudo-ranges, $\Delta PR_{LEO1}^{snGNSSP}$, $\Delta PR_{LEO2}^{snGNSSP}$, $\Delta PR_{LEO3}^{snGNSSP}$, ..., corresponding to the same satellite n of the GNSS P and measured at least at three LEO satellites, LEO1, LEO2, LEO3, ..., surrounding the user receiver/equipment, as represented on FIG. 10 (here the user equipment is symbolized with a diamond, and three LEO satellites delimit this zone). By using 1), the Delta code pseudo-ranges $\Delta PR_{LEO1}^{snGNSSP}$, $\Delta PR_{LEO2}^{snGNSSP}$ and $\Delta PR_{LEO3}^{snGNSSP}$, 2) the estimated LEO clock offsets, $\tilde{\tau}_{LEO1}$, $\tilde{\tau}_{LEO2}$ and $\tilde{\tau}_{LEO3}$, 3) the very precise estimations of the positions of the three LEO satellites, $[\tilde{x}_{LEO1}, \tilde{y}_{LEO1}, \tilde{z}_{LEO1}]$, $[\tilde{x}_{LEO2}, \tilde{y}_{LEO2}, \tilde{z}_{LEO2}]$ and $[\tilde{x}_{LEO3}, \tilde{y}_{LEO3}, \tilde{z}_{LEO3}]$, and the rough user receiver/equipment position, $[\tilde{x}_{0,r}, \tilde{y}_{0,r}, \tilde{z}_{0,r}]$, it is possible to derive an interpolated and more precise corrected Delta code pseudo-range $$\overline{\Delta PR}_{LEO}^{snGNSSp}$$

applicable to the Sat n of the GNSS P. The user receiver/equipment will then subtract the corresponding spatially interpolated and precise Delta code pseudo-range, $$\overline{\Delta PR}_{LEO}^{snGNSSp},$$

from $\Delta PR_r^{snGNSSP}$, yielding the corrected pseudo-range $$\left(\Delta PR_r^{snGNSSp} - \overline{\Delta PR}_{LEO}^{snGNSSp}\right)$$

Therefore, by using four similar equations for four satellites n=n1, n2, n3 and n4 of GNSS P, corrected with four interpolated Delta code pseudo-range, $$\left(\Delta PR_r^{snGNSSp} - \overline{\Delta PR}_{LEO}^{snGNSSp}\right)$$

obtained each with at least 3 measured LEO satellites, it is possible to form a system of four linear equations. This set enables one to solve the unknowns $\Delta xr$, $\Delta yr$, $\Delta zr$ and $\tau r$.

Instead of providing to the user equipment the Delta code pseudo-ranges measured at each LEO satellite, it is also possible to provide the "absolute" code pseudo-ranges $PR_{LEO}^{snGNSSP}$ to the user equipment, since this one has anyhow knowledge of the exact LEO satellite positions from the content of the navigation message including the predicted short term model and transmitted in the L-/C-/S-/K-/Ka frequency, and can therefore reconstruct the Delta code pseudo-ranges, $\Delta PR_{LEO}^{snGNSSP}$. At the end the transmission of the absolute pseudo-ranges or the Delta code pseudo-ranges mainly impact the bandwidth required to transmit this amount of data.

In order to reduce the contribution of clock offset of the LEO satellite $\tau_{LEO1}$ and the associated prediction residual, $\delta\tau_{LEO1}$ an alternative comprises building simple or double pseudo-range differences between the LEO satellites and the satellites of the primary GNSS and to transmit these simple/double differences to the user equipment. The simple differences enable one to remove the contribution from LEO clock offset $\tau_{LEO1}$, and the double differences enable one to remove the contribution from the GNSS satellite clock offsets.

$$\Delta PR_{LEO1}^{s1GNSSP} \approx c_0 \cdot (\delta\hat{\tau}_{s1GNSSP} - \hat{\tau}_{LEO1}) - \delta\hat{R}_{LEO1}^{orb,s1GNSSP} - \varepsilon_{res}^{LEO1}$$

$$\Delta PR_{LEO2}^{s1GNSSP} \approx c_0 \cdot (\delta\hat{\tau}_{s1GNSSP} - \hat{\tau}_{LEO2}) - \delta\hat{R}_{LEO2}^{orb,s1GNSSP} - \varepsilon_{res}^{LEO2}$$

$$\Delta PR_{LEO1}^{s2GNSSP} \approx c_0 \cdot (\delta\hat{\tau}_{s2GNSSP} - \hat{\tau}_{LEO1}) - \delta\hat{R}_{LEO1}^{orb,s2GNSSP} - \varepsilon_{res}^{LEO1}$$

$$\Delta PR_{LEO1}^{s2GNSSP} \approx c_0 \cdot (\delta\hat{\tau}_{s2GNSSP} - \hat{\tau}_{LEO2}) - \delta\hat{R}_{LEO2}^{orb,s2GNSSP} - \varepsilon_{res}^{LEO2}$$

Simple Difference:

$$\Delta PR_{LEO1}^{s1GNSSP,s2GNSSP} = (\Delta PR_{LEO1}^{s1GNSSP}) - (\Delta PR_{LEO1}^{s2GNSSP})$$

$$\Delta PR_{LEO2}^{s2GNSSP,s1GNSSP} = (\Delta PR_{LEO2}^{s2GNSSP}) - (\Delta PR_{LEO2}^{s1GNSSP}) \quad \text{(eq. 30)}$$

Double Differences:

$$\nabla\Delta PR_{LEO1,LEO2}^{s2GNSSP,s1GNSSP} = (\Delta PR_{LEO1}^{s2GNSSP,s1GNSSP}) - (\Delta PR_{LEO2}^{s2GNSSP,s1GNSSP}) \quad \text{(eq. 31)}$$

The simple differences $\Delta PR_{LEO1}^{s2GNSSP,s1GNSSP}$ and $\Delta PR_{LEO2}^{s2GNSSP,s1GNSSP}$ of (eq. 30) can be generated on-board each of the LEO and LEO2 satellites and can be disseminated to the terrestrial user equipment. In order to generate the double differences of (eq. 31) it is necessary to exchange the Delta code pseudo-ranges between LEO satellites. Therefore, an inter-satellite link is required to form such double differences. Once generated, the double differences can be disseminated to the user equipment.

Most of the derivations described in detail are based on the pseudo-range measurements obtained with the code measurement. In order to achieve better accuracy performances, it is also possible to apply the former principle for carrier measurements. This principle is applied for Kinematic positioning. If the accuracy levels are much better for kinematic positioning, the main drawback is the determination and carrier phase ambiguity. Herein, similar methods already proposed for Kinematic positioning using terrestrial baseline (for example the "Lambda" method) could be re-used.

It is emphasized that the orbit and clock correction model, of index $i^{snGNSSP}$, which is used to compute the Delta code pseudo-range, ($\Delta PR_{LEO1}^{snGNSSP}$, $\Delta PR_{LEO2}^{snGNSSP}$, ...) on-board the LEO satellites is the one modulated onto the signals transmitted by the satellites of the primary GNSS P that the user equipment will apply to perform its PVT calculation, and which contribution will be suppressed in the ($\Delta PRr - \Delta PRLEO1$) subtraction. This correction model can be, for example, the GPS correction data modulated onto the GPS signals. This prediction model does not have to be equal to the optimal orbit and clock correction model, of index $i_{opt}^{sn}(k)$ which minimizes at each epoch the impact of the orbit and clock residual onto the position of the LEO satellite. Both are independent. Equations (eq. 22), (eq. 23) and (eq. 24) help understanding the corresponding differences.

The foregoing detailed description with respect to FIGS. 1 to 9 can be used for the following FIGS. 10 and 11 explaining in detail the method, system, satellite and user equipment.

FIG. 10 schematically illustrates a method for each of a plurality of satellites of a secondary Global Navigation Satellite System, GNSS, in a Low Earth Orbit, LEO. The method comprises receiving S1010 multiple GNSS signals, in a first frequency band, from Line-of-sight, LOS, satellites of at least one primary GNSS, in particular primary GNSSs, in a Medium Earth Orbit, MEO. The method further comprises receiving S1020 candidate sets of orbit and clock corrections for the LOS satellites of the at least one primary GNSS. The method may further comprise determining S1030 an optimal set of orbit and clock corrections from the candidate sets of orbit and clock corrections. The method further comprises performing S1040 a Position-Velocity-Time, PVT, calculation based on code and/or carrier pseudo-ranges between a respective satellite of the plurality of satellites of the secondary GNSS and the LOS satellites of the at least one primary GNSS. The code and/or carrier pseudo-ranges are derived by the received multiple GNSS signals. Further, the code and/or carrier pseudo-ranges are corrected by a single set of the candidate sets of orbit and clock corrections. The single set may be the optimal set. The method further comprises determining S1050 a short-term prediction model for an orbit and clock of the respective satellite of the plurality of satellites of the secondary GNSS based on the PVT. The method further comprises transmitting S1060, in a second frequency band which can be identical or different to the first frequency band, a navigation message modulated onto a LEO navigation signal intended for terrestrial user equipment, wherein the navigation message includes the short-term prediction model. The method may further comprise transmitting S1070 to other LEO satellites simple Delta code and/or carrier pseudo-ranges measured between the satellites of the at least one primary GNSS to be augmented and the LEO satellites. The calculation is based on the set of orbit and clock corrections modulated onto the signals transmitted by the satellites of the primary GNSS to be augmented, in order to build double Delta code and/or carrier pseudo-ranges. The method may further comprise transmitting S1080 to the end-users either Delta code and/or carrier pseudo-ranges or simple Delta code and/or carrier pseudo-ranges or double Delta code and/or carrier pseudo-ranges, on a frequency which can be the same as for the LEO navigation signal or another communication frequency.

FIG. 11 schematically illustrates a system 1100 comprising the secondary GNSS 1111 and the terrestrial user equipment 1130. Satellites 1110 of the secondary GNSS 1111 operable in a Low Earth Orbit, LEO, are illustrated. The satellite 1110 comprises at least one receiving unit 1114, an on-board computer unit, OBCU, 1112 and a transmitting unit 1116. The satellite can further comprise at least one inter-communication module 1117, each adapted to perform inter-communication with other satellites of the secondary GNSS. The at least one receiving unit 1114 is adapted to receive multiple GNSS signals, in a first frequency band, from Line-of-sight, LOS, satellites of at least one primary GNSS, in particular primary GNSSs, in a Medium Earth Orbit, MEO. The at least one receiving unit 1114 is adapted to receive candidate sets of orbit and clock corrections for the LOS satellites of the at least one primary GNSS. Further, at least one other receiving unit 1118 is adapted to receive candidate sets of orbit and clock corrections for the LOS satellites of the at least one primary GNSS. The at least one other receiving unit 1118 is adapted to receive the candidate sets of orbit and clock corrections from ground or ground stations and/or SBAS. The on-board computer unit 1112 may be adapted to determine an optimal set of orbit and clock corrections from the candidate sets of orbit and clock corrections. The on-board computer unit 1112 is adapted to perform a Position-Velocity-Time, PVT, calculation based on pseudo-ranges between the LOS satellites of the at least one primary GNSS and the satellite. The pseudo-ranges are derived by the received multiple GNSS signals. Further, the pseudo-ranges are corrected by a single set of the candidate sets of orbit and clock corrections. The single set may be the optimal set. Further, the on-board computer unit 1112 is adapted to determine a short-term prediction model for an orbit and clock of the satellite based on the PVT. The transmitting unit 1116 is adapted to transmit, in a second frequency band which can be identical or different to the first frequency band, a navigation message modulated onto a LEO navigation signal intended for terrestrial user equipment, wherein the navigation message includes the short-term prediction model. Further, the terrestrial user equipment 1130 is illustrated. The terrestrial user equipment 1130 comprises a receiving unit 1132 and a processing unit 1134. The receiving unit 1132 is adapted to receive the LEO navigation signals, together with navigation messages modulated on it, from the satellites 1110 of the secondary GNSS. The processing unit 1134 is adapted to determine a position based on the LEO navigation signals used for ranging and on the short-term navigation message used to correct the obtained pseudo-ranges. The receiving unit 1132 is adapted to receive navigation signals from LOS satellites of the at least one primary GNSS. The processing unit 1134 is also adapted to determine an accurate position based on the navigation messages and the navigation signals from the LOS satellites of the at least one primary GNSS, and/or based either on the Delta code pseudo-ranges or on the simple Delta code pseudo-ranges or the double Delta code pseudo-ranges.

The invention is not limited in any way to the embodiments described above. On the contrary, there are many possibilities for modifications thereof, which are apparent to an average skilled person without departing from the underlying idea of the invention as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for each of a plurality of satellites of a secondary Global Navigation Satellite System (GNSS) in a Low Earth Orbit (LEO) comprising:

receiving multiple GNSS signals, in a first frequency band, from Line-of-sight (LOS) satellites of at least one primary GNSS in a Medium Earth Orbit (MEO) via a receiving unit;

receiving candidate sets of orbit and clock corrections for the LOS satellites of the at least one primary GNSS via the receiving unit;

performing a Position-Velocity-Time (PVT) calculation based on at least one of code or carrier pseudo-ranges between the LOS satellites of the at least one primary GNSS and a respective satellite of the plurality of satellites of the secondary GNSS, wherein the at least one of code or carrier pseudo-ranges are derived from the received multiple GNSS signals, and wherein the at least one of code or carrier pseudo-ranges are corrected by a single set of the candidate sets of orbit and clock corrections via a computer unit;

determining a short-term prediction model for an orbit and clock of the respective satellite of the plurality of satellites of the secondary GNSS based on the PVT calculation via the computer unit;

transmitting, in a second frequency band, which is different or identical to the first frequency band, a navigation message modulated onto a LEO navigation signal intended for terrestrial user equipment, wherein the navigation message includes the short-term prediction model via a transmitting unit.

2. The method according to claim 1, wherein the method further comprises:
after receiving the candidate sets of orbit and clock corrections, determining an optimal set of orbit and clock corrections from the received candidate sets of orbit and clock corrections; and
wherein the single set of the candidate sets of orbit and clock corrections is the optimal set of orbit and clock corrections.

3. The method according to claim 1, wherein the step of receiving the candidate sets of orbit and clock corrections comprises at least one of:
receiving, from the LOS satellites of the at least one primary GNSS, at least part of the candidate sets of orbit and clock corrections included in a user navigation message intended for terrestrial user equipment;
receiving, from one or more Space-Based Augmentation Systems (SBAS) in a Geostationary Earth Orbit (GEO) at least part of the candidate sets of orbit and clock corrections, intended for terrestrial or airborne user equipment;
receiving, from at least one on-demand service provider, via a communication module on the respective satellite of the plurality of satellites of the secondary GNSS, at least part of the candidate sets of orbit and clock corrections; or
receiving, from at least one of
at least one LEO satellite of the plurality of satellites of the secondary GNSS, or
at least one on-demand GEO or MEO satellite providing, via an intercommunication module on the respective satellite of the plurality of satellites of the secondary GNSS, at least part of the candidate sets of orbit and clock corrections.

4. The method according to claim 1, further comprising:
after receiving the candidate sets of orbit and clock corrections, reducing a number of the candidate sets of orbit and clock corrections by using at least one of information about a newest Age of Data (AoD) or any other ancillary parameters informing on the quality of a prediction error;
after reducing the number of the candidate sets of orbit and clock corrections, determining a common aging period of the remaining sets of the candidate sets of orbit and clock corrections;
selecting an optimal set of orbit and clock corrections to be applied to the at least one of code or carrier pseudo-ranges between the respective satellite of the plurality of satellites of the secondary GNSS and the LOS satellites of the at least one primary GNSS taking into account a prediction error over the common aging period; and
correcting the at least one of code or carrier pseudo-ranges between the respective satellite of the plurality of satellites of the secondary GNSS and the LOS satellites of the at least one primary GNSS by the selected optimal set of orbit and clock corrections.

5. The method according to claim 4, wherein the ancillary parameters comprise at least one of SISA and DVS/SHS flags for Galileo or URA for GPS.

6. The method according to claim 1, further comprising:
determining at least one of Delta code or carrier pseudo-ranges or at least one of simple Delta code or carrier pseudo-ranges, wherein the step of transmitting further comprises:
transmitting the at least one of Delta code or carrier pseudo-ranges or the at least one of simple Delta code or carrier pseudo-ranges to the terrestrial user equipment, in a third frequency band, which is different or identical to at least one of the first or second frequency bands.

7. The method according to claim 6, further comprising
receiving, from another satellite of the plurality of satellites of the secondary GNSS, at least one of corresponding simple Delta code or carrier pseudo-ranges;
determining at least one of double Delta code or carrier pseudo-ranges based on the received at least one of simple Delta code or carrier pseudo-ranges and the on-board determined at least one of simple Delta code or carrier pseudo-ranges;
transmitting the determined at least one of double Delta code or carrier pseudo-ranges to the user equipment in the third frequency band.

8. A satellite for a secondary Global Navigation Satellite System (GNSS) operable in a Low Earth Orbit (LEO) comprising:
at least one receiving unit configured to:
receive multiple GNSS signals, in a first frequency band, from Line-of-sight (LOS) satellites of at least one primary GNSS in a Medium Earth Orbit (MEO) and
receive candidate sets of orbit and clock corrections for the LOS satellites of the at least one primary GNSS;
an on-board computer unit (OBCU) configured to:
perform a Position-Velocity-Time (PVT) calculation based on at least one of code or carrier pseudo-ranges between the satellite and the LOS satellites of the at least one primary GNSS, wherein the at least one of code or carrier pseudo-ranges are derived from the received multiple GNSS signals, and wherein the pseudo-ranges are corrected by a single set of the candidate sets of orbit and clock corrections, and
determine a short-term prediction model for an orbit and clock of the satellite based on the PVT; and a transmitting unit configured to transmit, in a second frequency band, which is different or identical to the first frequency band, a navigation message modulated onto a LEO navigation signal intended for terrestrial user equipment, wherein the navigation message includes the short-term prediction model.

9. The satellite according to claim 8, wherein the OBCU is further adapted to:
determine an optimal set of orbit and clock corrections from the candidate sets of orbit and clock corrections; and
wherein the single set of the candidate sets of orbit and clock corrections is the optimal set of orbit and clock corrections.

10. A terrestrial user equipment comprising:
a receiving unit adapted to receive navigation signals including navigation messages from one or more satellites, wherein each satellite is for a secondary Global Navigation Satellite System (GNSS) and is operable in a Low Earth Orbit (LEO) and wherein each satellite comprises at least one receiving unit configured to:
receive multiple GNSS signals, in a first frequency band, from Line-of-sight (LOS) satellites of at least one primary GNSS in a Medium Earth Orbit (MEO) and
receive candidate sets of orbit and clock corrections for the LOS satellites of the at least one primary GNSS; an on-board computer unit (OBCU) configured to:
perform a Position-Velocity-Time (PVT) calculation based on at least one of code or carrier pseudo-ranges between the satellite and the LOS satellites of the at least one primary GNSS, wherein the at least one of code or carrier pseudoranges are derived from the received multiple GNSS signals, and wherein the pseudo-ranges are corrected by a single set of the candidate sets of orbit and clock corrections, and
determine a short-term prediction model for an orbit and clock of the satellite based on the PVT; and
a transmitting unit configured to transmit, in a second frequency band, which is different or identical to the first frequency band, a navigation message modulated onto a LEO navigation signal intended for terrestrial user equipment, wherein the navigation message includes the short-term prediction model
and wherein the terrestrial user equipment receiving unit is further adapted to receive navigation signals from LOS satellites including navigation messages of at least one primary GNSS; and wherein the terrestrial user equipment further comprises
a processing unit adapted to determine a position based on the navigation messages and the navigation signals from the satellites.

11. The terrestrial user equipment according to claim 10, wherein the processing unit is further configured to determine the position based on at least one of
the navigation messages and the navigation signals from the LOS satellites of the at least one primary GNSS,
at least one of the Delta code or carrier pseudo-ranges,
at least one of the simple Delta code or carrier pseudo-ranges
at least one of double Delta code or carrier pseudo-ranges being combined with at least one of
at least one of the code or carrier pseudo-ranges measured with the navigation signals from the LOS satellites of the at least one primary GNSS,
at least one of the Delta code or carrier pseudo-ranges,
at least one of the simple Delta code or carrier pseudo-ranges, or
at least one of the double Delta code or carrier pseudo-ranges being transmitted in the third frequency band.

12. A system comprising:
a secondary Global Navigation Satellite System (GNSS) including one or more satellites wherein each satellite is for a secondary Global Navigation Satellite System (GNSS) and is operable in a Low Earth Orbit (LEO) and wherein each satellite comprises at least one receiving unit configured to:
receive multiple GNSS signals, in a first frequency band, from Line-of-sight (LOS) satellites of at least one primary GNSS in a Medium Earth Orbit (MEO) and
receive candidate sets of orbit and clock corrections for the LOS satellites of the at least one primary GNSS, an on-board computer unit (OBCU) configured to:
perform a Position-Velocity-Time (PVT) calculation based on at least one of code or carrier pseudo-ranges between the satellite and the LOS satellites of the at least one primary GNSS, wherein the at least one of code or carrier pseudoranges are derived from the received multiple GNSS signals, and wherein the pseudo-ranges are corrected by a single set of the candidate sets of orbit and clock corrections, and
determine a short-term prediction model for an orbit and clock of the satellite based on the PVT; and
a transmitting unit configured to transmit, in a second frequency band, which is different or identical to the first frequency band, a navigation message modulated onto a LEO navigation signal intended for terrestrial user equipment, wherein the navigation message includes the short-term prediction model; and wherein the system further comprises,
a terrestrial user equipment comprising:
a receiving unit adapted to receive navigation signals including navigation messages from the one or more satellites and to receive navigation signals from LOS satellites including navigation messages of at least one primary GNSS; and
a processing unit adapted to determine a position based on the navigation messages and the navigation signals from the one or more satellites.

* * * * *